United States Patent [19]

Tarran

[11] 4,287,623
[45] Sep. 8, 1981

[54] EMERGENCY RESCUE AXE DEVICE

[76] Inventor: Phil K. Tarran, Oceanside, Calif.

[21] Appl. No.: 23,318

[22] Filed: Mar. 23, 1979

[51] Int. Cl.³ .............................................. B25F 1/02
[52] U.S. Cl. .......................................... 7/158; 7/139; 7/166
[58] Field of Search .................... 7/100, 114, 116, 117, 7/138, 139, 143–145, 158, 159, 166–168; 81/180 R; 145/2 R, 3, 29 A

[56] References Cited

U.S. PATENT DOCUMENTS

| | | |
|---|---|---|
| 379,773 | 3/1888 | Ehlmann . |
| 494,161 | 3/1893 | Rankin . |
| 548,516 | 10/1895 | Caldwell . |
| 626,285 | 6/1899 | Metzger . |
| 784,959 | 3/1905 | Morris . |
| 855,741 | 6/1907 | Albert . |
| 872,271 | 11/1907 | Benet . |
| 874,409 | 12/1907 | Knight . |
| 919,132 | 4/1909 | Conley . |
| 926,496 | 6/1909 | Kahl et al. . |
| 1,021,931 | 4/1912 | James ................................. 145/2 R |
| 1,032,855 | 7/1912 | Ostby . |
| 1,164,765 | 12/1915 | Slee ..................................... 7/145 X |
| 1,174,267 | 3/1916 | Naffziger . |
| 1,249,752 | 12/1917 | Hathaway . |
| 1,314,434 | 8/1919 | Shoun et al. ........................ 7/144 X |
| 1,603,645 | 10/1926 | Snitzler . |
| 1,923,964 | 8/1933 | Benton . |
| 2,300,840 | 11/1942 | Huxel . |
| 2,377,730 | 6/1945 | Vosbikian et al. . |
| 2,804,109 | 8/1957 | Fatica . |
| 3,074,752 | 1/1963 | Kirkel . |
| 3,219,316 | 11/1965 | Fried . |
| 3,473,712 | 10/1969 | Genchi ............................... 7/145 X |
| 3,599,255 | 8/1971 | Carroll, Sr. . |
| 3,604,028 | 9/1971 | Wardwell . |
| 3,623,173 | 11/1971 | Hagqvist . |
| 3,694,918 | 10/1972 | Bailey et al. . |
| 3,710,407 | 1/1973 | Reid . |
| 3,824,641 | 7/1974 | Shandel . |
| 3,837,023 | 9/1974 | Spencer-Foote . |
| 3,882,560 | 5/1975 | Carrer . |
| 3,934,287 | 1/1976 | Howard . |
| 4,114,216 | 9/1978 | Gatby . |
| 4,183,385 | 1/1980 | Burkybile .......................... 145/29 A |

Primary Examiner—James G. Smith
Attorney, Agent, or Firm—John L. Haller

[57] ABSTRACT

A combination tool is disclosed particularly suitable for emergency rescue applications, generally composed of two pivotally connected elongate handle members having an axe head and pick head mounted respectively thereon. The handle members may be locked together to be used as a composite structure, scissored apart to perform a variety of wire cutting and clamping functions, or alternatively separated from one another to be used independently. A plurality of head attachments are additionally disclosed which may be selectively mounted onto the axe head member to adapt the tool for use as a spade, hoe, hewing adz, basher, metal cutter, strap wrench, pipe wrench, and various other tools. The head attachments are mounted to the axe head member by a rotatable locking member which provides a quick connect and disconnect means for securing the attachments to the device. A holster, shoulder strap, and shoulder harness are utilized to carry the combination tool and head attachments upon a user. These are also adapted to serve as a boatswain's chair.

80 Claims, 36 Drawing Figures

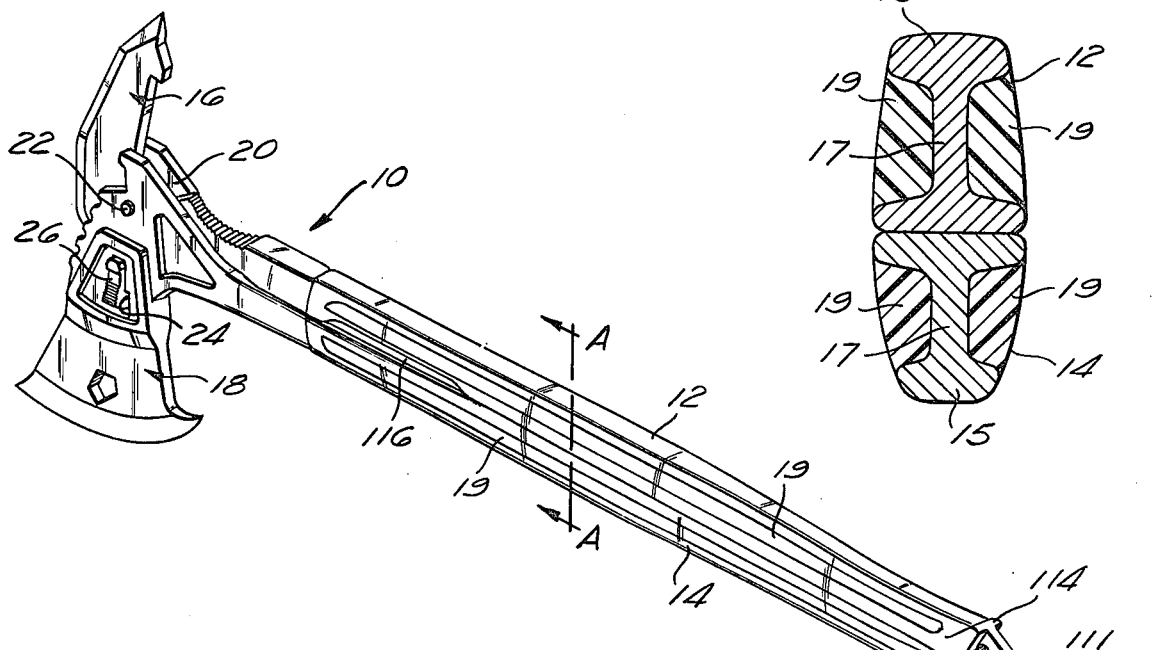
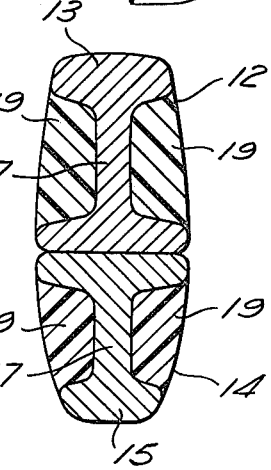
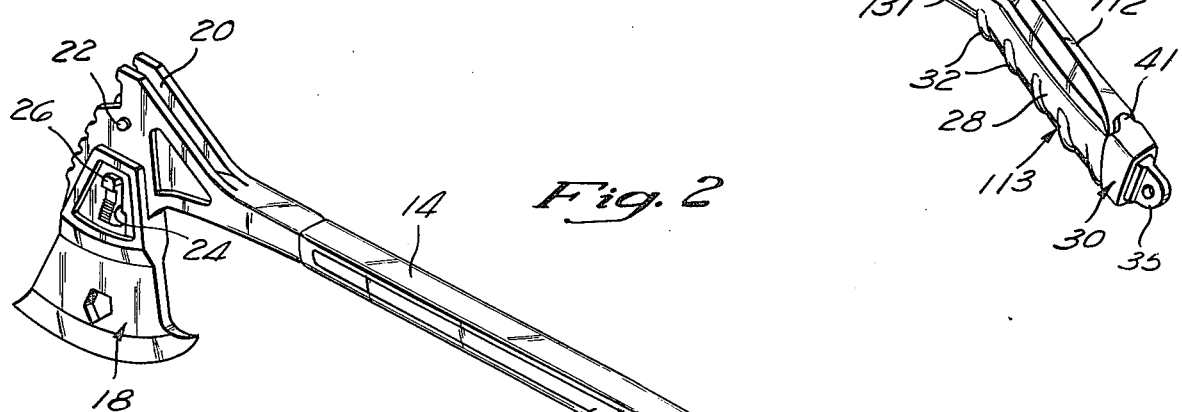
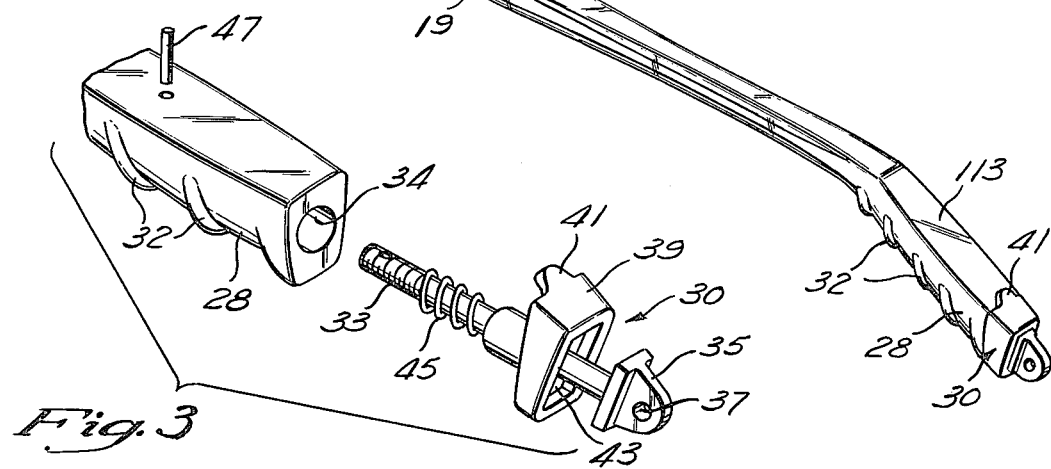

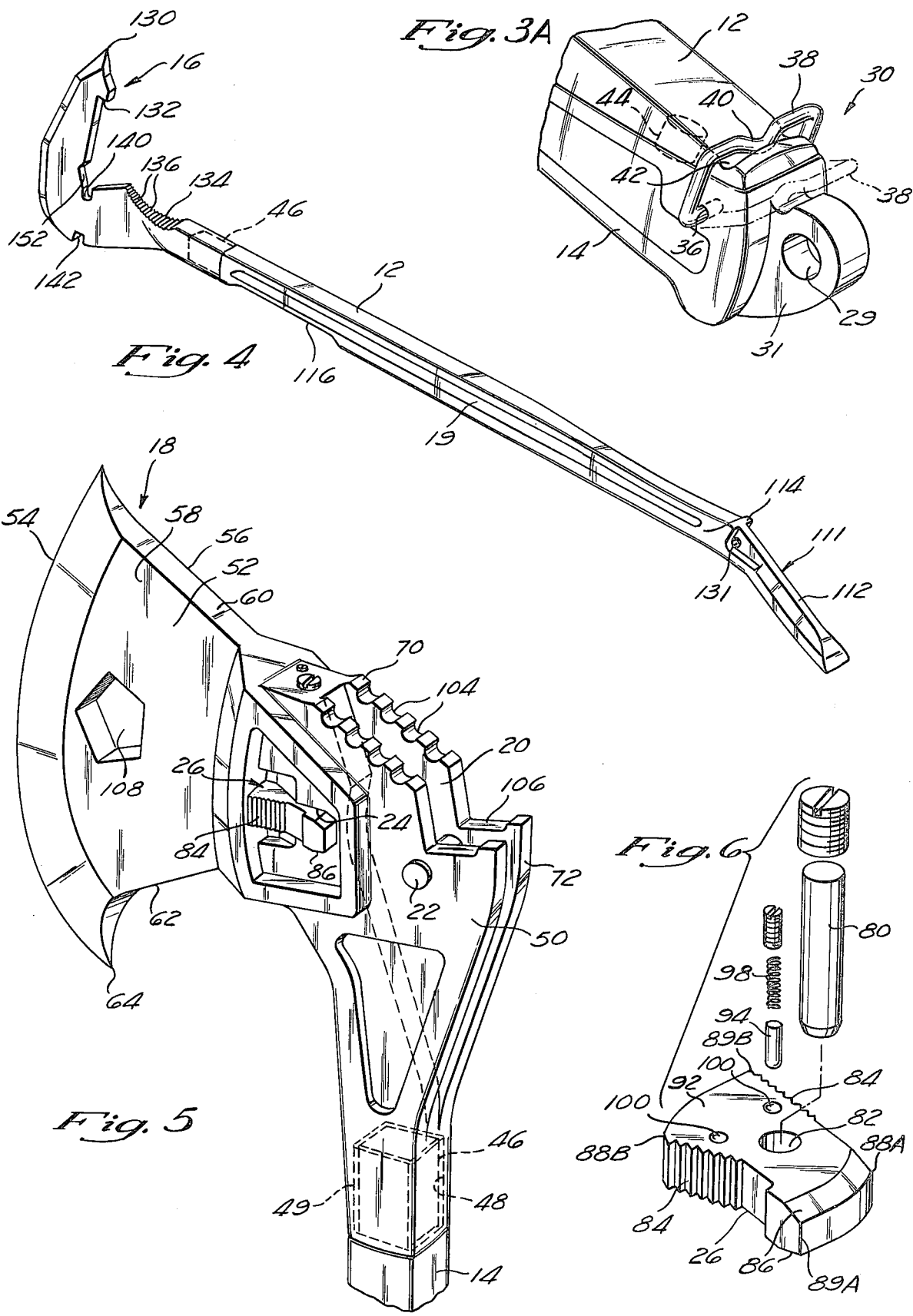

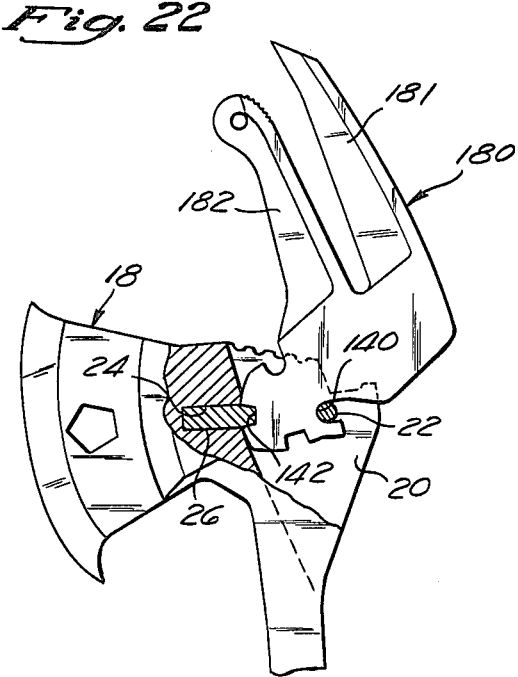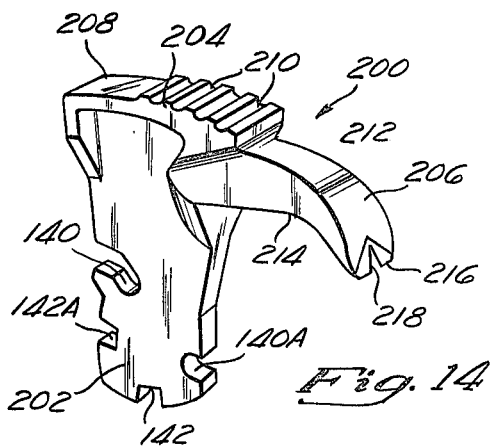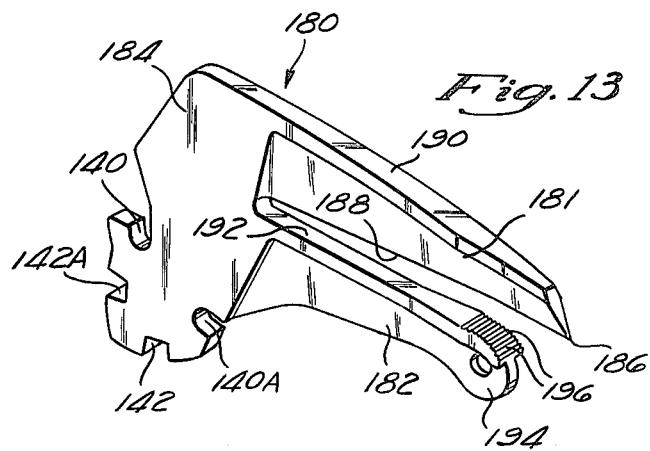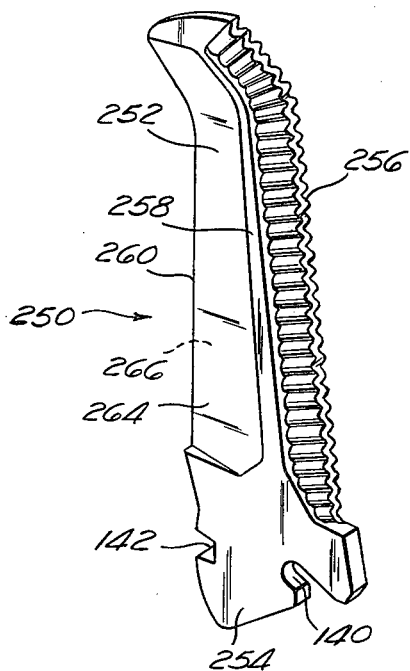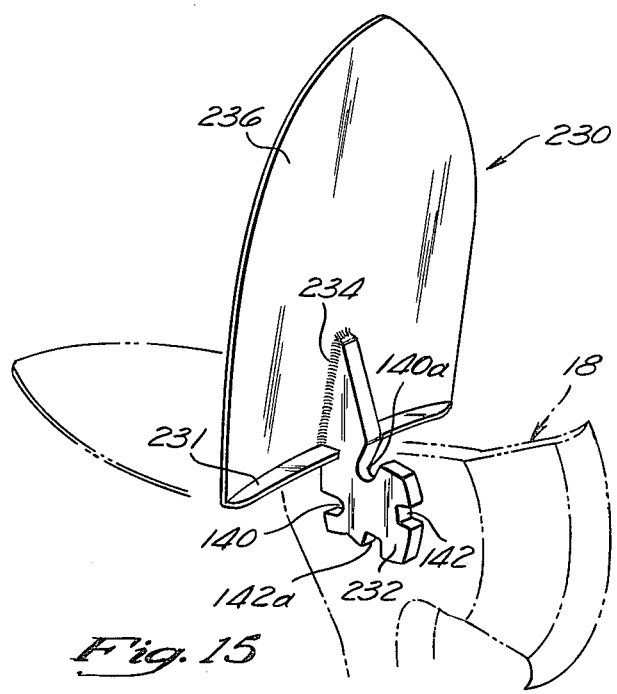

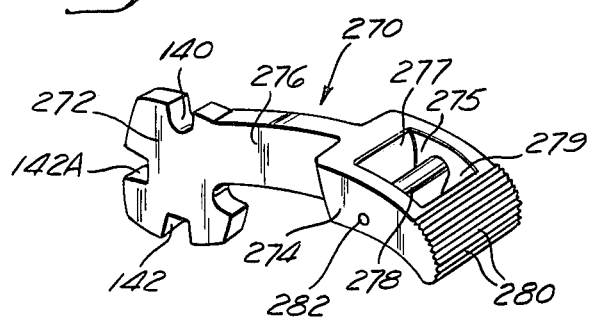
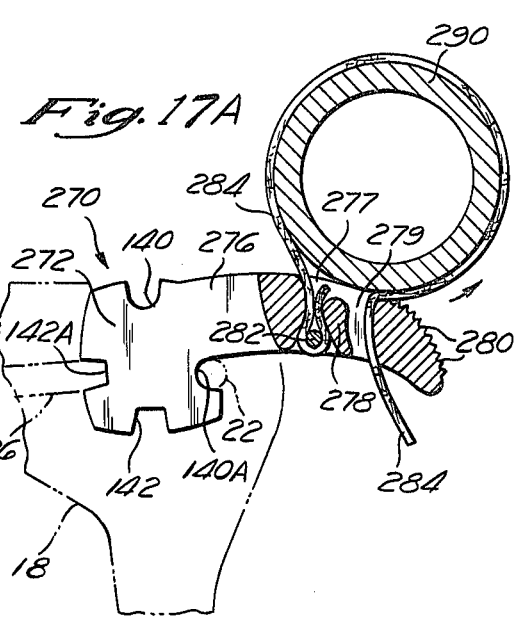
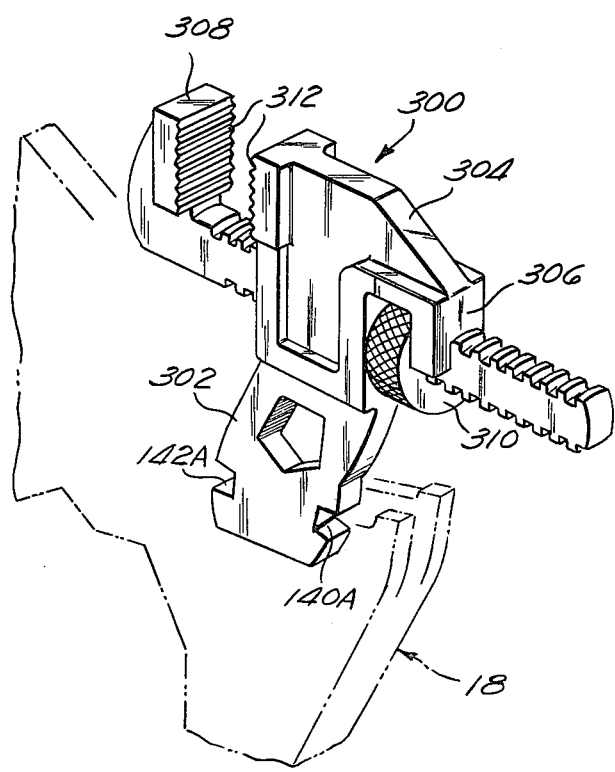

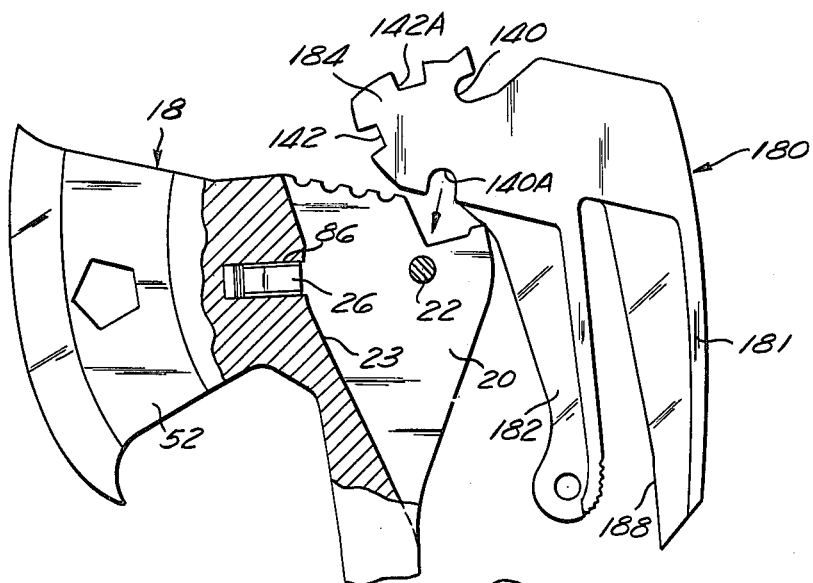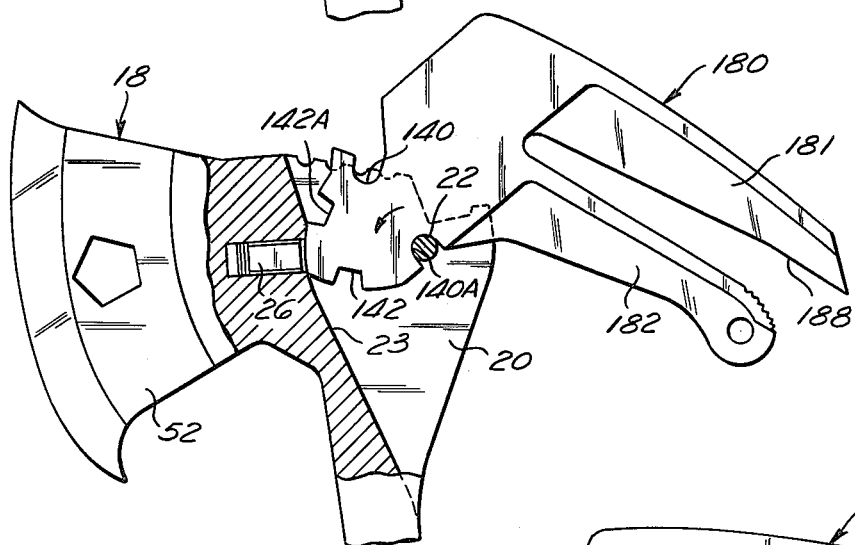

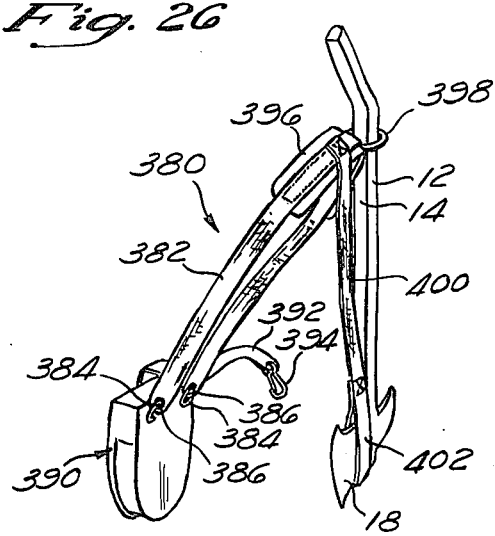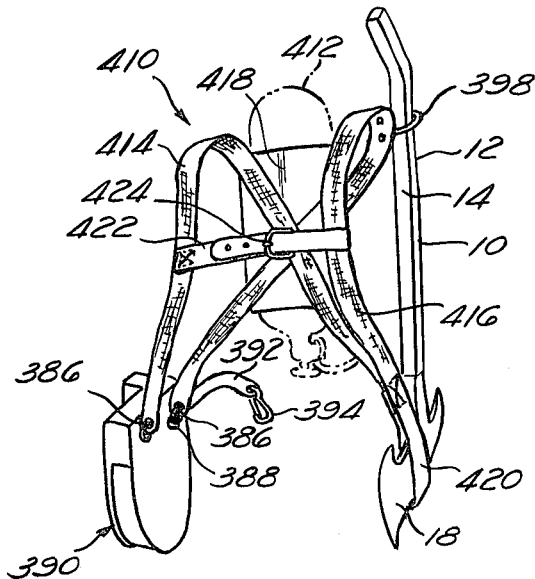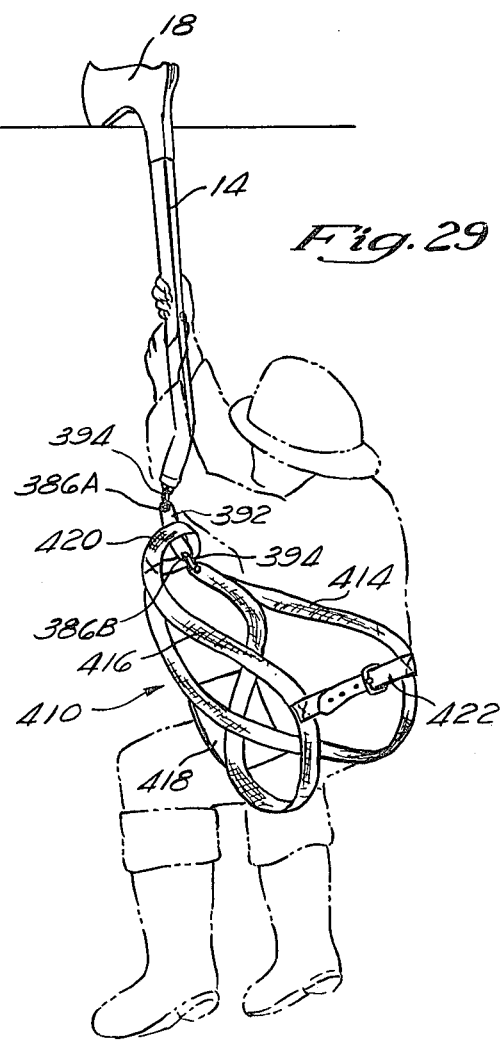

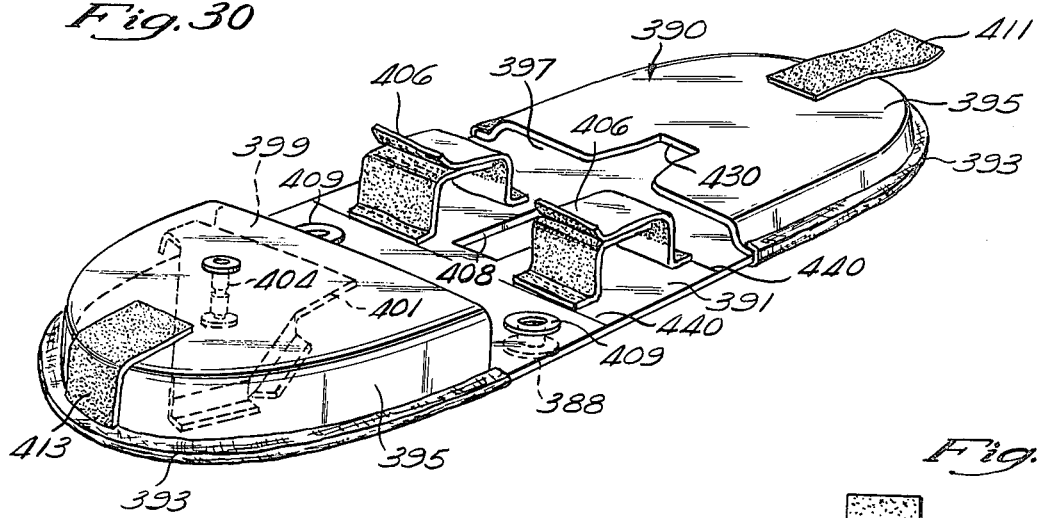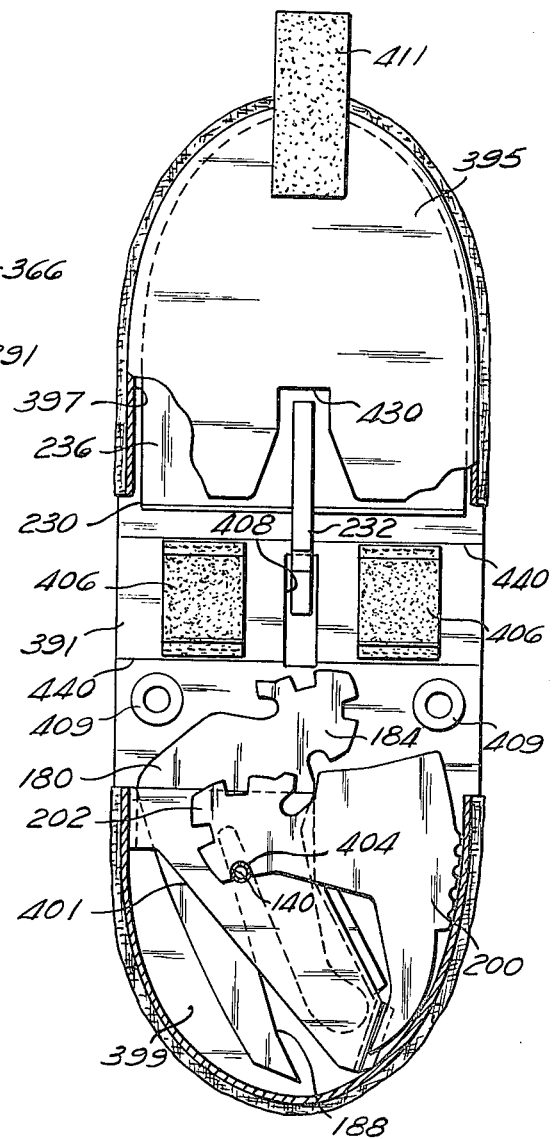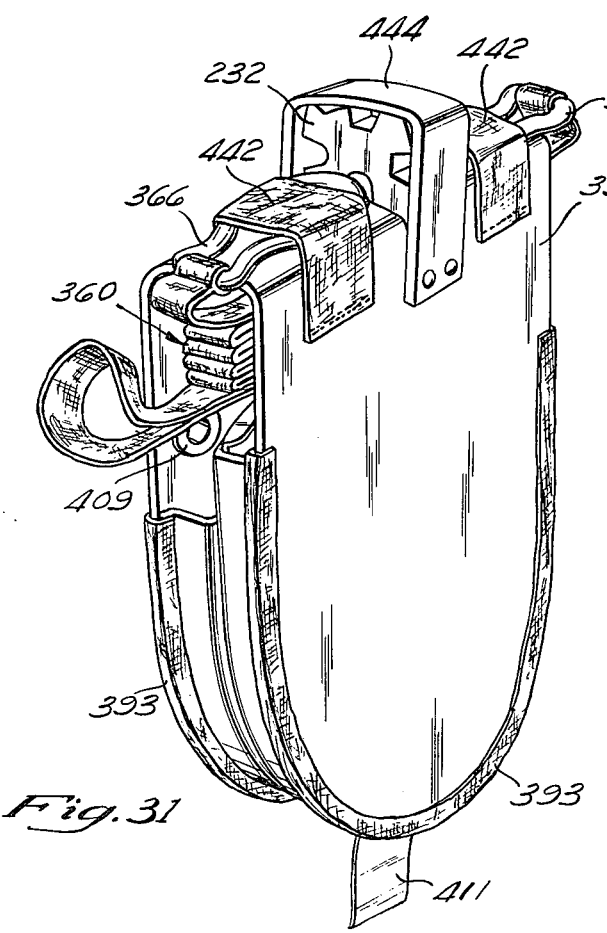

EMERGENCY RESCUE AXE DEVICE

BACKGROUND OF THE INVENTION

The present invention relates to combination tools and more particularly to combination tools utilized by firemen and other rescue personnel in emergency rescue applications.

Typically, a fireman or other rescue worker is confronted with extremely diverse emergency situations wherein it is often necessary, for example, to break down a door or wall, clear ground brush, shear sheet metal structures, sever electrical power lines, or dig small excavations. As such, the typical rescue worker is required to arrive at an emergency scene possessing a plurality of tools, each capable of performing a specific function.

In those few instances where vehicle access to the immediate emergency scene is readily available, the storage, transport, and handling problems associated with these numerous tools pose, at a minimum, a substantial inconvenience to the rescue worker. However, in most instances where access is limited, these problems become acute, requiring the rescue worker to manually carry a variety of heavy, cumbersome tools into a remote emergency rescue area.

Further, in such instances, it is often difficult to fully appraise the needed rescue tools prior to on-the-scene inspection, thereby necessitating the rescue worker to leave the emergency scene to retrieve the proper tool.

As will be recognized, such storage, transport, and retrieval problems pose a serious handicap to the rescue worker, and result in the loss of valuable time which may well be the difference between life and death. Thus, there exists a need in the rescue field for a special tool particularly adapted to meet the diverse situations typically confronted by rescue workers.

The prior art has attempted to provide partial solutions for this problem. Thus, combination tools specifically designed for rescue applications are described in Spencer-Foote, U.S. Pat. Nos. 3,837,023, Wardwell, 3,604,023, Reid, 3,710,407, Albert, 855,741, and Carrer, 3,882,560. Although such devices have proven somewhat useful in their limited applications, they have possessed serious deficiencies which have curtailed their widespread use and adoption in the rescue field.

In particular, most prior art devices have suffered from their inability to completely meet the diversity required in rescue applications, often necessitating the rescue workers to additionally carry one or more other specialized tools into the rescue area. Further, in an attempt to meet the diversity, many prior art tools, such as that disclosed in Vosbikian et al, U.S. Pat. No. 2,377,730, have stored one or more sharp blade attachments directly upon the handle of the device. Although such designs increased the versatility of the device, they additionally posed a severe safety hazard to the rescue worker.

Further, in other prior art devices (such as Morris, U.S. Pat. Nos. 784,959 and Shoudel, 3,824,641), a series of tool attachments have been utilized to increase the versatility of the combination tool. However, these attachments have typically been threaded onto the device, thereby requiring a substantial period of time in set-up, as well as requiring the use of either a screwdriver or wrench to mount the head attachments directly upon the tool. Additionally, most of these prior art combination tools have comprised either light, fragile devices which were incapable of withstanding the high structural stresses encountered in rescue applications, or extremely heavy apparatus, which proved cumbersome in use. Thus, the prior art devices do not meet the multi-faceted demands of the rescue field.

SUMMARY OF THE PRESENT INVENTION

The present invention provides a combination tool specifically adapted for emergency rescue operations which significantly eliminates the deficiencies associated in the prior art combination rescue tool devices.

The combination tool of the present invention (hereinafter referred to as rescue axe device) is basically composed of two elongate handle members which are respectively provided with an axe head and pick head. The pick head is pivotally mounted within a recess formed in the axe head and both handle members are secured together at their opposite ends by a releasable fastener.

By this particular mounting arrangement, the emergency rescue axe device of the present invention may be used as a composite unit with both handle members being (a) locked together, (b) scissored apart about the pivot to perform a variety of cable cutting and clamping functions, (c) reverse mounted about the pivot for extension to an approximate 180° orientation to form a pry bar, or (d) separated to permit the independent use of each of the handle members.

Additionally, the emergency rescue axe device of the present invention includes a plurality of head attachments which may be selectively mounted to the axe head member when the pick head member is separated therefrom. These attachments, when disposed upon the axe head member, permit the emergency rescue axe device to function as a basher or adz, metal cutter, saw, brush hook, spade, hoe, spike puller, spanner wrench, and many other tools.

Thus, from the above, it will be recognized that the present invention significantly improves over the prior art designs by providing a maximum assistance combination tool which may be adapted to perform nearly every operation encountered by firemen or rescue workers by simply selectively inserting one of the head attachments onto the axe head handle member.

A significant feature of the emergency rescue device of the present invention is a rotatable cam-like locking member which positively secures both the pick head and the plurality of head attachments to the axe head. In the preferred embodiment, this rotatable locking mechanism thereby provides a quick connect and disconnect mechanism for each of the head attachments with the full lock to full open position being accomplished by merely a manual 90° rotation of a lock member. As such, the present invention provides a significant improvement over the prior art rescue devices by facilitating the adaption of the rescue device to a particular tool configuration in a matter of seconds, without using auxiliary tools such as a screwdriver or wrench.

The emergency rescue axe device of the present invention additionally possesses moderate weight, being easily carried and manipulated by a single fireman or rescue worker, yet is structurally capable of withstanding the high stress demand associated with rescue applications. Further, the present invention provides a novel means of allowing a rescue worker to extricate himself from a burning building by using one or both of the handle members as a ledge hanger or walker.

Rather than storing the head attachments directly upon the handle members, which, as mentioned previously, poses a significant safety hazard to the rescue worker, the present invention additionally contemplates a holster, shoulder strap, and shoulder harness adapted to carry the rescue axe device as well as the head attachments, upon the rescue worker. Thus, the present invention allows the rescue worker to have the benefit of a plurality of individual tools within his immediate vicinity without the added weight, awkwardness, or safety hazard associated with the prior art rescue devices. Further, the shoulder harness or strap may easily be adapted into a boatswain's chair or utilized in connection with the handle members to function as a body and equipment restraint or an elongate climb down means.

DESCRIPTION OF THE DRAWINGS

These and other features of the present invention will become more apparent upon reference to the drawings wherein:

FIG. 1 is a perspective view of the emergency rescue axe device of the present invention depicted with the two handle members locked together to form a composite structure;

FIG. 1A is a cross-sectional view taken about lines A—A of FIG. 1 illustrating the I-beam construction of the handle members of the present invention;

FIG. 2 is a perspective view of the axe head handle member of FIG. 1 illustrating the detailed construction thereof;

FIG. 3 is an enlarged exploded view of the handle lock mechanism mounted upon the end of the axe head handle member of FIG. 2;

FIG. 3A is an alternative embodiment of the handle lock mechanism of FIG. 3;

FIG. 4 is a perspective view of the pick head handle member of FIG. 1;

FIG. 5 is an enlarged perspective view of the axe head member of FIG. 2 showing the detailed construction thereof;

FIG. 6 is an enlarged exploded view of the rotatable locking mechanism of the present invention;

FIG. 13 is a perspective view of the metal cutter or can opener head attachment of the present invention;

FIG. 14 is a perspective view of the basher-adz head attachment of the present invention;

FIG. 15 is a perspective view of the spade and hoe head attachment of the present invention, oriented upon the axe head to function as a spade;

FIG. 16 is a perspective view of the brush hook and sawtooth head attachment of the present invention;

FIG. 17 is a perspective view of the strap wrench head attachment of the present invention;

FIG. 17A illustrates the manner in which the strap wrench head attachment of FIG. 17 may be utilized;

FIG. 18 is a perspective view of the pipe wrench head attachment of the present invention oriented upon the axe head;

FIG. 19 is a partial cross-sectional view of the axe head attachment of FIG. 2 showing the initial alignment of the metal cutter head attachment of FIG. 13 thereon;

FIG. 20 is a partial cross-sectional view of the axe head attachment of FIG. 2, depicted with the metal cutter attachment of FIG. 13 positioned about the pivot pin and disposed within the recess formed in the axe head;

FIG. 21 is a partial cross-sectional view of the axe head of FIG. 2 showing the metal cutting head attachment of FIG. 14 locked into one of its operational orientations upon the axe head;

FIG. 22 is a partial cross-sectional view of the axe head of FIG. 2 showing an alternative orientation of the metal cutter attachment of FIG. 13 mounted thereto;

FIG. 26 is a perspective view of the holster and shoulder strap carrying apparatus of the present invention supporting the emergency rescue axe;

FIG. 27 is a perspective view of the holster and shoulder harness arrangement of the present invention specifically adapted to carrying the emergency rescue axe device;

FIG. 28 is a perspective view of the shoulder strap of FIG. 26 adapted into a body restraint and secured to the pick head handle member of the present invention;

FIG. 29 is a perspective view of the shoulder harness of FIG. 27 adapted into a boatswain's chair and affixed to the axe handle member of the present invention;

FIG. 30 is a perspective view of the holster of FIGS. 26 and 27 showing its detail construction and its compartmentalized structure;

FIG. 31 is an enlarged perspective view of FIG. 30 showing the holster folded over onto itself and carrying the belt restraints of FIG. 25; and FIG. 32 is a plan view of the holster of FIG. 30 showing the manner in which the various attachments are carried therein.

DETAILED DESCRIPTION OF THE PREFERRED EMBODIMENT

Figure 8:
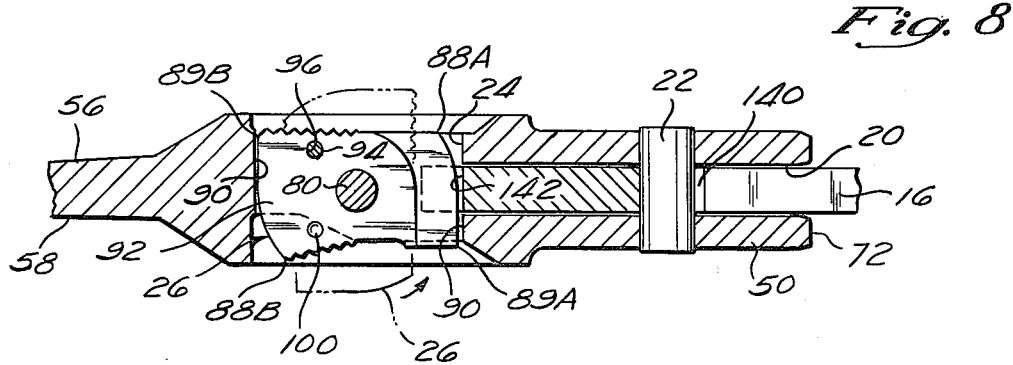
FIG. 8 is a cross-sectional view taken about lines 8—8 of FIG. 7 showing the operation of the rotatable locking mechanism.

Referring to FIG. 1, there is shown the combination tool-emergency rescue axe device 10 of the present invention composed generally of the upper and lower elongate handle members 12 and 14, respectively. A pick head 16 and axe head 18 are rigidly mounted to the handle members 12 and 14, respectively, with the pick head 16 being disposed within a recess 20 centrally formed along a peripheral edge of the axe head 18.

The pick head 16 is pivotally mounted about a pin 22, which is rigidly secured to the axe head 18 and extends perpendicular across the width of the recess 20. As will become more apparent below, this pivot pin mounting of the pick head 16 to the axe head 18 permits the handle members 12 and 14 to be utilized as a composite unit, scissored apart and used in conjunction with each other, or alternatively separated from one another for independent use.

The axe head 18 includes a rectangular central aperture 24 oriented generally perpendicular to the lower handle member 14 which extends slightly within the recess 20. This aperture 24 mounts a rotatable locking mechanism 26 which, as will be explained more in detail infra, selectively prohibits pivoting of the pick head 16 relative the axe head 18 and additionally registers and mounts each of the head attachments (shown in FIGS. 13 through 18) to the axe head 18.

At the opposite end from the pick head 16 and axe head 18, the handle members 12 and 14 are both reduced in cross-section and extend angularly downward (as viewed in FIG. 1) to form a composite grip 28. The lower handle member 14 adjacent the extreme end of the grip 28 is additionally provided with a handle lock member designated generally by the numberal 30. A portion of the handle lock member 30 extends slightly above the top end surface of the handle member 12 and is slidingly mounted to reciprocate in the direction indicated by the arrow in FIG. 1, thereby selectively maintaining the two handle members 12 and 14 together.

Thus, it will be noted that with the handle members 12 and 14 oriented in a manner depicted in FIG. 1 and locked into position by the handle lock member 30 and rotatable lock member 26, the rescue axe 10 of the present invention may be utilized as a composite unit, functioning as either a heavy duty axe or pick.

The Handle Members

Referring now to FIGS. 1 and 1A, it may be seen that the handle members 12 and 14 are preferably formed from a pair of elongate I-beam members 13 and 15, respectively, which are fabricated of structural steel. To provide the handle members 12 and 14 with a generally rectangular cross-section, an electrically insulating epoxy or plastic material 19 is preferably molded directly upon the I-beam members 13 and 15, being disposed within the voids on opposite sides of the central webs 17. The applicant has found that this particular I-beam/plastic insert construction yields a significantly strong handle member, capable of withstanding the forces exerted in rescue applications while providing a relatively light-weight and comfortable handle for the device 10.

Both of the handle members 12 and 14 include complementary angularly inclined portions 111 and 113, respectively, adjacent one of their ends which, as previously mentioned, forms the composite grip 28 of the device 10. As best shown in FIG. 4, the inclined portion 111 of the upper handle member 12 is formed as a pry bar member 112 which includes a heel segment 114 extending substantially perpendicular therefrom. This heel segment 114 strengthens the transition between the I-beam member 13 and inclined portion 111, and additionally provides a self-contained pivot point for the pry bar head 112 during use (to be described in more detail below).

The inclined portion 113 of the lower handle member 14 is preferably provided with a plurality of spaced ribs 32 which extend circumferentially along its lower surface to comfortably accommodate the hand of the user. This portion 113 additionally includes a threaded aperture 34 (as shown in FIG. 3) which receives one end of a mating threaded shaft 33 of the handle lock member 30. The opposite end of the shaft 33 is provided with an eyelet head 35 having a rectangular cross-sectional configuration and including an aperture 37 extending perpendicular to the axis of the shaft 33.

Surmounted about the shaft 33 and disposed between the eyelet head 35 and grip 28 is a latch member 39, having a protruding frontal tab 41 and rectangular recess 43 formed at its opposite ends. The recess 43 is formed slightly greater than the exterior dimensions of the eyelet head 35 such that the latch member 39 may slide partially over the eyelet head 35. Further, the protruding tab 41 is formed to extend over a portion of the end of the handle member 12 (shown in FIG. 1) when both handle members are abutted tightly against each other. The latch member 39 is constantly biased toward the end of the grip 28 by a spring 45 disposed about the shaft 33 and maintained in an extended orientation. To prevent the shaft 33 from accidentally turning out of the aperture 34 and to mount the spring 45 to grip 28, a pin 47 extends through the grip 28 and shaft 33.

As will be recognized by such an arrangement, the eyelet head 35 is rigidly attached to the grip 28 while the latch member 39 may be reciprocated a short distance along the shaft 33 by manually overcoming the biasing force of the spring 45, thereby releasably locking the handle members 12 and 14 together.

An alternative embodiment for the locking member 30 is shown in FIG. 3A. In this embodiment, the lower handle member 14 is provided with an integrally formed flange 31 adjacent its extreme end and includes an aperture 29 extending perpendicular therethrough. An additional pair of apertures 36 are formed in the handle member 14 which pivotally mount a spring clip or fastener 38 having an inwardly projecting section 40.

As shown, the projecting section 40 mates with the groove 42 formed in the upper handle member 12 thereby securely locking the handle member 12 and 14 together. To prevent the accidental releasing of the clip 38 from the groove 42, a rubber grommet 44 is provided on the upper handle member 12 which urges the handle members 12 and 14 apart. As will be recognized, to release the handle members 12 and 14, a user need only compress the grommet 44 by squeezing the handles 12 and 14 together and pivot the clip 38 in a clockwise direction to a position indicated by the phantom lines of FIG. 3A.

The other end of the handle members 12 and 14 preferably includes a reduced cross-sectional or shanked down section 46 (as best shown in FIG. 5) which is received within a mating aperture 48 centrally formed in one end of the pick and axe heads 16 and 18, respectively. The sections 46 are rigidly maintained within the aperture 48 by an epoxy or ceramic adhesion 49 which electrically isolates the handle members 12 and 14 from the pick and axe heads 16 and 18. In the preferred embodiment, this ceramic or epoxy adhesion 49 comprises a $\frac{1}{8}$-inch thick wall which encapsulates the sections 46 tightly seated within the aperture 48, thereby securely mounting the handle members 12 and 14 to the heads 16 and 18, respectively.

The Axe Head

Referring again to FIG. 5, the axe head 18 is formed in a substantially L-shaped configuration having a central body portion 50 and a blade portion 52. The blade portion 52 includes an arcuate lower edge 54 formed into a knife edge by the two planar surfaces 56 and 58 which extend from the body portion 50 and angularly converge toward the edge 54.

The edge 54 protrudes beyond the side edges 60 and 62 of the blade 52, and forms a shark's tooth point 64 adjacent the side edge 62, which is directed angularly toward the handle member 14. The applicant has found that this particular shark's tooth point 64 permits the axe head 18 and handle member 14 to function as a ledge hanger (as will be described in more detail infra).

As previously mentioned, the axe head 18 includes a recess 20 which initiates along the top and side edges 70 and 72, respectively, of the axe head 18 and extends substantially into the body portion 50 (as indicated by the phantom lines in FIG. 5). The width of the recess 20 is preferably formed to be slightly greater than the thickness of the pick head 16 (shown in FIG. 4) and head attachments (shown in FIGS. 13-18), such that these members may be received tightly therein.

A pin 22 is rigidly mounted on the body portion 50 of the axe head 18 and is disposed perpendicularly across the width of the recess 20. As shown, the pin 22 is retained in position by a set screw 95 which threadingly engages an aperture 97 formed on the side edge 60 of the head 18. This pin 22 provides a common pivot and alignment means for the pick head 16 and head attachments within the recess 20.

Disposed centrally within the axe head 18 and located generally within the transition between the blade portion 52 and body portion 50 is an elongate aperture 24 which extends a short distance into the recess 20. In the preferred embodiment, this aperture 24 receives a cam-like rotatable locking mechanism 26 which is mounted about a shaft 80 (FIG. 6) extending perpendicularly through the aperture 24 from the top edge 70 of the axe head 18.

The rotatable locking member 26 has a substantially rectangular configuration with an eccentric aperture 82 extending therethrough. Opposite edges 83 adjacent one end of the lock member 26 are provided with a serrated area 84 which provides a non-slip surface adapted to be contacted by the thumb or finger of a user. The sidewalls adjacent the other end of the lock member 26 are additionally provided with a tapered edge 86 which, as will be explained in more detail infra, mates with the tapered edges of a dog 142 formed in the pick head 16 and head attachments.

The length of the locking member 26 is slightly less than the length of the aperture 24 (shown in FIG. 8) with the lower front corner and upper rear corner 88A and 88B, respectively, including an enlarged radius thereon. As shown in FIG. 8, this enlarged radius clears these two corners of the lock mechanism 26, thereby permitting the lock mechanism 26 to rotate partially through the aperture 24. It will be noted, however, that this rotation is limited to 90°-120° from a "locked" to an "unlocked" position, wherein with the corners 89A and 89B (not including the enlarged radius) abut the end walls 90 of the aperture 24 formed in the head member 18.

To provide moderate resistance to the rotation of the lock member 26 about the pin 80, the lock member 26 cooperates with a small pin 94 disposed within an aperture 96 and oriented parallel to and adjacent with the pin member 80. In the preferred embodiment, this pin 94 is fabricated from a nylon or steel material and is biased against the sidewall 92 of the lock member 26 by a spring 98 disposed within the aperture 96.

Two small indentations 100A and 100B (shown in FIGS. 6 and 8) are formed along the sidewall 92 of the lock member 26, and spaced radially outward from the eccentric aperture 82 at a distance equal to the distance between the center lines of the pin 22 and aperture 96. The diameter of the indentation 100 is sized slightly less than the diameter of the pin member 94 such that the pin member 94 may only enter partially within the indentations 100. As will be recognized by such a design, the pin 94 and indentations 100 form a detent mechanism which moderately maintains the lock member 26 in either a fully closed position (as indicated in FIG. 8), or a fully open position (represented by the phantom lines in FIG. 8).

The upper edge 70 of the axe head member 18 is provided with a plurality of small indentations or fillets 104 which extend in a direction parallel to the axis of the pivot pin 22. The spacing between adjacent fillets 104 is advantageously designed to mate with a typical residential or commercial gas shut-off valve (not shown) thereby allowing the axe head 18 to function as a gas valve wrench.

Adjacent the fillets 104, and formed at the intersection of the edges 70 and 72, the axe head 18 additionally includes an L-shaped notch 106 preferably having an included angle slightly greater than 90°. As will become more apparent below, this notch 106 forms a vise surface for the axe head 18 which cooperates with a portion of the pick head 16 to serve as a cable cutter. Further, the axe head 18 is provided with a pentagonal aperture 108 formed centrally within the blade section 52 which is sized to receive a fire hydrant shut-off valve (not shown). Thus, from the above, it will be recognized that the axe head 18 and its handle member 14 may be used independently of the pick head 16 to function as a light-duty axe, gas valve shut-off wrench, or fire hydrant wrench.

The Pick Head

Figure 7:
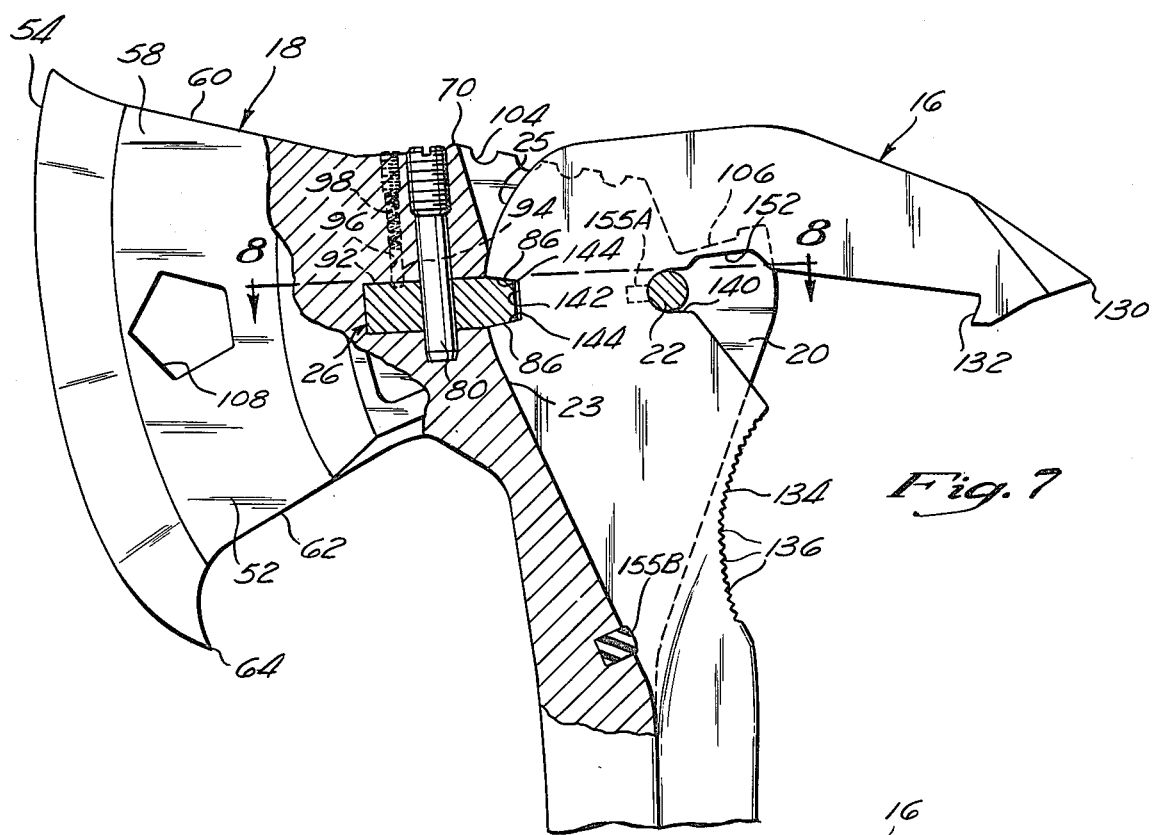
FIG. 7 is an enlarged partial cross-sectional view of the axe head and pick head mounted together and maintained in position by the rotatable locking mechanism of FIG. 6.

Referring to FIGS. 4 and 7, it may be seen that the pick head 16 is preferably formed in a generally C-shaped configuration, the open end of which converges to form a pick point 130. A flange 132 is provided along the lower edge of the pick point 130 and extends angularly inward toward the handle member 12. This flange 132 is analogous to the shark's tooth point 64 of the axe head 18 and permits the pick head 16 and handle 12 to additionally function as a ledge hanger.

Formed adjacent the lower end of the pick head 18 and disposed along the interior edge thereof, is a concave gripping surface 134 having a plurality of serrated teeth members 136. In the preferred embodiment, these teeth members 136 serve as a glass hasp which effectively remove broken pieces of glass from windows or the like and additionally cooperate with the flange 132 of the pick point 130 to function as a spanner wrench.

Formed centrally within the pick head 16 and adjacent the interior edge thereof, is a pivot slot 140 having a generally U-shaped configuration. The width of the slot 140 is sized slightly greater than the diameter of the pivot pin 22, located on the axe head 18, such that when the pick head 16 is inserted within the recess 20, the pivot pin 22 resides within the U-shaped slot 140.

Located on the outer edge of the pick head 16, and opposite the U-shaped pivot slot 140, is a locating dog 142 having a pair of tapered sidewalls 144. The width of the dog 142, as well as the angle of the tapered sidewalls 144, is sized to compliment and receive the beveled sidewalls 86 of the rotatable lock mechanism 26. Thus, when the lock member 26 is rotated to its "lock" position, the dog 142 receives the beveled surfaces 86 of the lock mechanism 26. As a result, the pick head 16 is securely mounted within the recess 20 formed in the axe head 18.

When used independently, the pick head 16 and its handle member 12 functions as an effective, multi-purpose combination tool. The pick head 16 may be utilized as a standard pick, or may advantageously form a mattress hook, allowing a rescue worker to drag a burning mattress (not shown) or the like from the interior of a building. Similarly, as previously described, the pick head 16 may opt as a glass rasp or a spanner wrench.

Further, the U-shaped slot 140 allows the pick head 16 to function as a lock hasp breaker. In such an operation, a shackle (not shown) or a padlock (not shown) or the like may be inserted within the U-shaped slot 140, thereby securing the shackle therein. Subsequently, the handle member 12 may be rotated, wherein the shackle is twisted within the hasp (not shown) causing the hasp to break.

Alternatively, the pry bar end 112 of the handle member 12 may be utilized as a light-duty pry bar having a self-contained fulcrum point formed by the heel segment 114.

Pivotal Mounting of Pick and Axe Heads

With the basic structure defined, the mounting of the pick head 16 to the axe head 18 as well as the operation of the rotatable lock mechanism 26 may be described. With the rotatable lock mechanism 26 disposed in its "unlocked" vertical orientation indicated by the phantom lines of FIG. 8, the pick point 130 of the pick head 16 may be inserted into the recess 20 of the axe head 18 between the pivot pin 22 and the rotatable lock mechanism 26. Inserted therein, the pick head 16 may be moved laterally outward within the recess 20 causing the pivot pin 22 to reside within the pivot slot 140, as shown in FIG. 7.

Subsequently, the pick head 16 may be swiveled about the pin 22 until the dog 142 aligns with the lock mechanism 26. The lock mechanism 26 may then be rotated in a counter-clockwise direction as indicated by the arrow in FIG. 8 to its "lock" position wherein the beveled edges 86 of the lock mechanism 26 enter within the dog 142. Since the beveled edges 86 are formed to tightly mate with the side edges 144 of the dog 142, once entered therein, the beveled edges 86 securely lock the pick head 16 to the axe head 18. As will be recognized, while in this locked position, the detent mechanism 94 mates with the indentation 100 as on the lock mechanism 26 (shown in FIG. 8) thereby preventing the accidental unlocking of the lock member 26 during use of the device 10. Further, to prevent excessive vibration between the pick and axe heads 16 and 18, a pair of rubber dampeners 155A and 155B may be provided on the pick and axe heads, respectively, which moderately bias these members together.

To facilitate the pivoting of the pick head 16 within the recess 20 of the axe head 18, the serrated edge 84 of the lock mechanism 26 need only be depressed, thereby overcoming the biasing force of the spring 98 of the detent detent pin 94, and causing the lock mechanism 26 to rotate out of the dog 142 of the pick head 16. Once rotated beyond the dog 142, the detent pin 94 enters the other indentation 100B, thereby retaining the rotatable lock mechanism 26 in its unlocked position (as indicated by the phantom lines in FIG. 8). Subsequently, the handle members 12 and 14 may be scissored apart causing the pick head 16 to pivot about the pin 22 within the recess 20 of the axe head 18.

Figure 9:
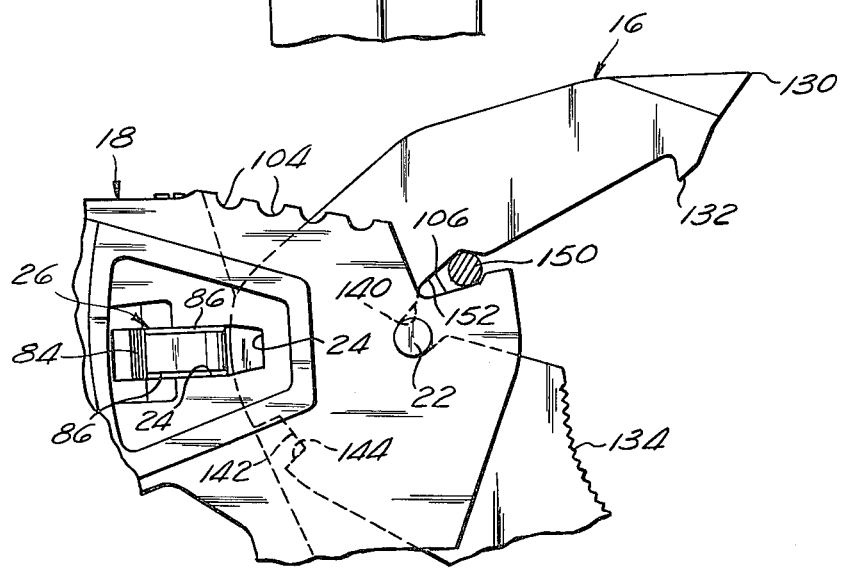
FIG. 9 is an elevational view of the axe head and pick head members of the present invention scissored apart about their pivot pin and functioning as a cable cutter.

As shown in FIG. 9, by this pivoting of the pick head 16 relative the axe head 18, the rescue axe device 10 of the present invention may be utilized to sever an electrical cable or wire 150. In this cable cutting operation, the cable 150 is disposed between the L-shaped notches 106 formed in the axe head 18 and a cutting recess 152 formed on the interior edge of the pick head 16. By manually urging the handle members 10 and 12 together, this cutting recess 152 exerts a shearing force upon the cable 150 thereby causing the cable 150 to sever or break. It will be noted that in the preferred embodiment, due to the handle members 12 and 14 being approximately 2½ feet long, even large cables 150 may be sheared in this manner, with the handle members 12 and 14 functioning as force increasing lever arms. Further, due to the handle members 12 and 14 being electrically isolated from the heads 16 and 18 by the epoxy or ceramic adhesion 49, even live wires or cables 150 may be severed by the device 10.

Figure 12:
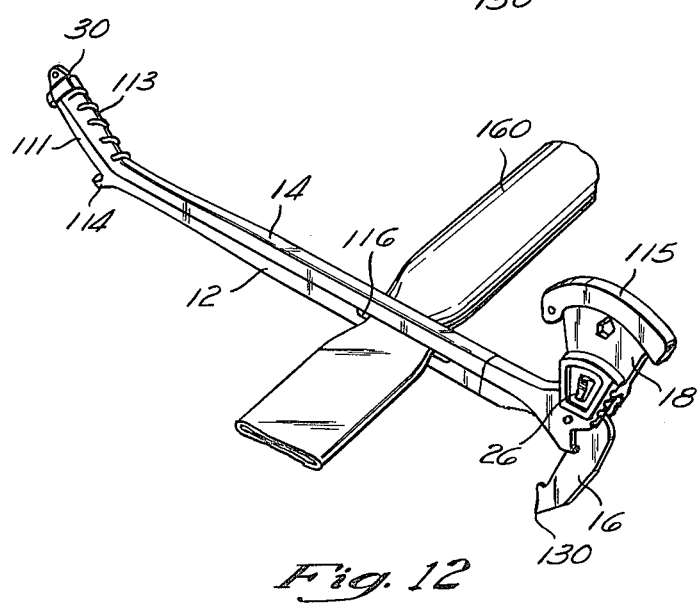
FIG. 12 is a perspective view of the handle members being scissored together to serve as a hose clamp.

Alternatively, as shown in FIG. 12, by this pivoting or scissoring of the handle members 12 and 14, the apparatus 10 of the present invention may also be utilized as a hose clamp. When functioning as a hose clamp, the handle members 12 and 14 are initially positioned on opposite sides of the hose 160, with the hose being registered along the length of a reduced cross-section segment 116 formed on the handle member 12 (best shown in FIG. 4). Subsequently, the handle members 12 and 14 may be scissored together as illustrated in FIG. 12, and retained in position by the handle lock member 30. Since the lower surface of the reduced section 116 is raised slightly from the top surface of the handle member 14, the thickness of the hose 160 is accommodated therein, such that the handle members 12 and 14 may be secured together by the handle lock member 30.

Extended Pry Bar Configuration

Figure 10:
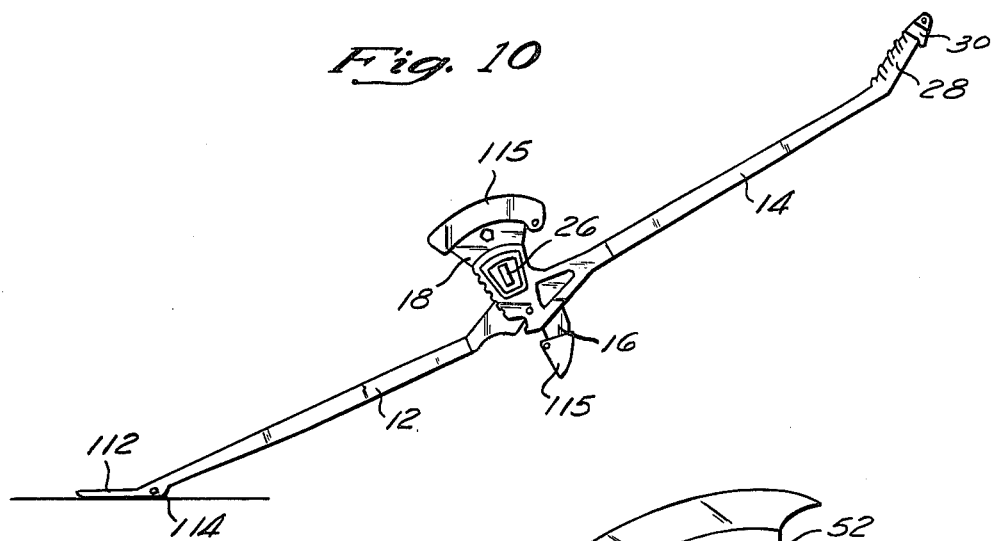
FIG. 10 is an elevational view of the emergency rescue axe device of the present invention showing the particular pry bar extension of the handle members.

Referring now to FIG. 10, the extended pry bar configuration of the emergency rescue device 10 of the present invention is shown wherein the handle members 12 and 14 may be used in conjunction with each other to form a rigid prying member. In the preferred embodiment, this pry bar configuration may be accommodated in a matter of seconds with the handle members 12 and 14 being oriented at approximately 180° from one another and securely locked into position by the rotatable locking mechanism 26.

Figure 11:
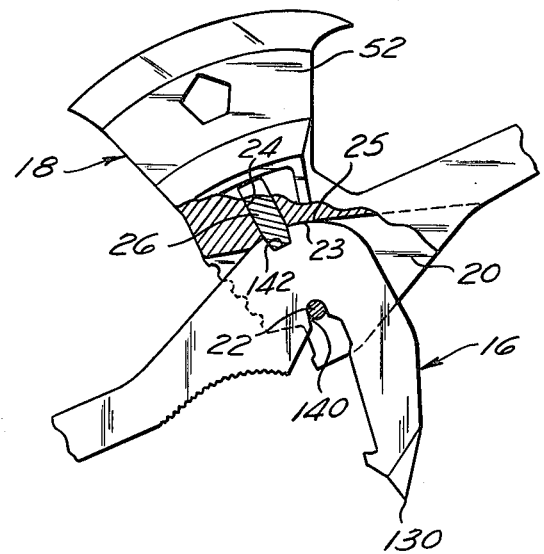
FIG. 11 is an enlarged partial cross-sectional view of the axe head and pick head members when oriented in the pry bar extension of FIG. 10.

To facilitate this extended pry bar position, the pick head 16 must be inverted with respect to the axe head 18 and be inserted into the recess 20 from above the axe head 18, as depicted in FIG. 11. In this inverted position, the pivot slot 140 of the pick head 16 is surmounted about the pin 22 on the axe head 18 while the dog 142, formed on the pick head, mates with the rotatable locking mechanism 26 in a manner previously described.

As shown, the rear wall 23 of the recess 20 is formed having a concave configuration proximal the rotatable locking member 26. This concave rear wall 23 tightly mates or abutts the convex curvilinear heel 25 of the pick head 16. As such, the forces exerted upon the interconnection of the pick and axe heads 16 and 18 during use as distributed across the rear wall 23, rather than be carried exclusively by the locking member 26. Thus, with the locking member 26 communicating with the dog 142 and the rear wall 23 and head 25 abutted together, the substantially parallel orientation of the pick head and axe head handle members 12 and 14 is maintained which provides a rigid pry bar structure. The abutted complimentary orientation of the rear wall 23 and the head 25 is also shown in FIG. 7 for the pick axe orientation, FIGS. 21 and 22 for the metal cutting head configuration (see below) and FIG. 17 for the strap range configuration (see below). The complimentary abutted orientation enables impact received by the pick or other head attachment to be transmitted to the rear wall 23 and not imposed upon the pin 22 because of the orientation of the opening of the pivot slot 140.

In operation, the extended pry bar orientation of the present invention provides an extremely heavy-duty prying member having an effective length of approximately 5 feet. Further, due to the heel portion 114 extending outward from the lower surface of the handle member 12, a self-contained pivot point is provided which significantly eliminates the need for blocking or wedging under the pry bar head 112 during use. Additionally, to prevent any possibility of injury to a user, a sheath 115 may be placed over the blade 52 of the axe head 18 and on the pick head 16 during prying operations. Any force resulting from a bending moment between the axe 18 and the pick head 16 or other head attachment, for example as in the extended pry bar configuration shown in FIGS. 10 and 11, is equally distributed between the pin 22 and locking mechanism 26.

The Head Attachments

In FIGS. 13 through 18, the various head attachments of the present invention, which may be selectively mounted upon the axe head 18 to perform a variety of specific functions, are illustrated. As will become more apparent below, in the preferred embodiment each of these head attachments is provided with multiple pairs of pivot slots 140 and dogs 142 which facilitate their common mounting and locking upon the axe head member 18 in the manner previously described in relation to the pick head 16.

Metal Cutting Head

Referring to FIG. 13, the metal cutter head attachment 180 of the present invention is illustrated, composed generally of a cutter blade 181 and prying arm 182 extending substantially perpendicular from a body flange 184. The cutter blade 180 preferably includes a penetrater point 186 at one end, a knife edge 188 which extends throughout the lower edge thereof. The upper edge 190 of the blade 181 is preferably formed having a thickness slightly greater than the remainder of the metal cutter attachment 180 which gradually converges angularly at both ends thereof, to blend with the penetrating point 186 and body flange 184, respectively.

The pry arm 182 is disposed at a slightly divergent angle to the knife edge 188 of the blade member 181, such that a V-shaped opening is formed between the cutter blade 181 and pry arm 182. The length of the pry arm 182 is preferably formed slightly less than the length of the cutter blade 181 and terminates at a rounded button-like end 194. The top edge 192 of the pry arm 182 comprises a generally flat surface which increases in thickness from the body flange 184 to the rounded end 194. In the preferred embodiment, this top edge 192 includes a plurality of serrated teeth 196 formed adjacent the rounded end 194, which serve as a gripping surface during operation.

Adjacent the lower end of the body flange 184 are a pair of pivot slots 140 and 140A as well as a pair of dogs 142 and 142A which are formed in a manner previously described in relation to the dog 142 and pivot slot 140 of the pick head member 16 (shown in FIG. 7). The slot 140A and dog 142A, as well as the slot 140 and dog 142, are located on opposite edges of the body flange 184 and are aligned with one another such that two discrete pivot and dog pairs are provided. As will be recognized, each of these pivot and dog pairs facilitate different mounting positions of the metal cutter attachment 180 upon the axe head 18.

Head Attachment Common Mounting

The dual position or orientation of the metal cutter attachment 180 upon the axe head 18 is illustrated in FIGS. 19–22. It will be noted that during mounting, the rotatable locking member 26 which provides a common locking means for both the handle members 12 and 14 and the head attachments is disposed in its unlocked position, as indicated by the phantom lines in FIG. 8. As shown in FIG. 19, during mounting, the metal cutter attachment 180 is initially positioned above the axe head 18 and aligned with the recess 20. Subsequently, the metal cutter attachment 180 may be inserted within the recess 20 with the pivot slot 140A receiving the pivot pin 22 of the axe head (as shown in FIG. 20).

Once disposed about the pin 22, the metal cutter attachment 180 may be rotated in a counter-clockwise direction (as indicated by the arrow shown in FIG. 20) until the dog 142A aligns with the lock mechanism 26. Subsequently, the lock mechanism 26 may be rotated to its closed position (FIG. 8) into the dog 142, thereby securely locking the metal cutter head attachment 180 onto the axe head 18. As will be recognized, in this mounting position with the pivot slot 140A being disposed about the pivot pin 22 and the dog 142A receiving the lock member 26, the metal cutter attachment 180 extends substantially parallel to the axe head 18.

Alternatively (as shown in FIG. 22), the metal cutter attachment 180 may be mounted upon the axe head 18 such that the pivot slot 140 is surmounted about the pivot pin 22, and the dog 142 mates with the rotatable lock mechanism 26. When mounted in this manner, the metal cutter head attachment 180 is disposed substantially perpendicular to the axe head 18 and extends above the top surface of the axe head 18.

Thus, by use of the pair of pivot slots 140 and 140A and dogs 142 and 142A on the head attachment 180, the metal cutter attachment 180 may be mounted to the axe head 18 at either of two discrete positions, thereby permitting the head attachment 180 to be utilized in connection with the axe head handle member 14 in a manner most conducive to the particular metal cutting application.

The operation of the metal cutter head attachment 180 of the present invention is as follows. For purposes of illustration, the operation will be discussed with the metal cutter head attachment 180 mounted to the axe head 18 in the orientation shown in FIG. 21, i.e., with the metal cutter head 180 extending substantially parallel to the axe blade 18. It will be recognized, however, that this same discussion will apply to the head attachment 180 oriented as shown in FIG. 22.

In this orientation, a user may grip the handle member 14 of the axe head 18 and swing the metal cutter head attachment 180 to contact a sheet metal surface (not shown). Upon contact therewith, the penetrating point 186, which extends beyond the end of the pry arm 182, serves the sheet metal (not shown), thereby allowing a portion of the knife edge 188 to engage the sheet metal.

Once inserted therein, the user may rock the handle member 14 back and forth causing the knife edge 188 of the metal cutter attachment 180 to shear or rip the sheet metal (not shown). During this rocking procedure, it will be recognized that the serrated edge 196 of the pry arm 182 cams against the outer surface of the sheet metal (not shown) and provides a substantially non-slip pivoting surface. As such, by pivoting the handle member 14 about the serrated edge 196, the knife edge 188 is pulled through the sheet metal (not shown).

Further, it will be recognized that due to the top edge 190 of the head attachment 180 being slightly greater in thickness than the remainder of the head attachment 180, and angularly converging adjacent the penetrating point 186 and body flange 184, during the cutting process, the sheet metal (not shown) is spread apart in the vicinity of the cutting location. This spreading action permits the head attachment 180 to be easily removed and reinserted into the sheet metal structure during the cutting operation.

Thus, from the above, it will be understood that by use of the metal cutter head attachment 180, the present invention may quickly and easily be adapted to perform metal cutting operations.

Basher-Adz Head

In FIG. 14, the basher/adz head attachment 200 is shown which, as with the metal cutter head attachment 180, is selectively mountable upon the axe head 18. The basher/adz head attachment 200 is formed having a body flange 202, an enlarged basher head section 204, and an elongate adz section 206 which extends generally perpendicular to the basher section 204.

The top edge 208 of the basher section 204 is preferably formed having a slight curvature and includes a plurality of grooves 210 which extend approximately half the length of the edge 208. As shown, the cross-sectional area of the basher section 204 is substantially greater than the cross-sectional area of the body flange portion 202 such that the majority of the weight of the head attachment is carried adjacent the top edge 208 of the attachment 200.

The elongate adz section 206 is formed having a convex and concave upper and lower surface, 212 and 214, respectively, which converge at one end thereof to form an adz hewing edge 216. In the preferred embodiment, this edge 216 is additionally provided with a V-slot 218 which advantageously cooperates with the top edge 208 of the basher section 204 to function as a spike or nail puller.

As with the metal cutter attachment 180, the basher/adz attachment 200 includes two pairs of pivot pin slots 140 and 140A and dogs 142 and 142A disposed generally on opposite edges of the body flange 202, which facilitate a multiple position mounting of the attachment 200 on the axe head 18. As will be recognized, with the pivot slot 140 disposed about the pivot pin 22 and dog 142 aligned and mating with the rotatable lock member 26 in the manner described infra, the basher/adz attachment 200 extends generally parallel to the axe head 18 lying on the opposite side of the handle member 14. Alternatively, with the pivot slot 140A disposed about the pivot pin 22, and the dog 142A aligned and mating with the lock mechanism 26, the basher/adz attachment 200 is disposed substantially perpendicular to axe head 18 extending above the top surface of the axe head 18.

When the pivot slot 140 and dog 142 are utilized to mount the basher/adz attachment 200 to the axe head 18, the attachment 200 may function as a heavy-duty sledge hammer with the top surface 208 extending outwardly to be contacted against a desired structure (not shown). Alternatively, by mounting the basher/adz head attachment 200 on the axe head 18 by use of the pivot slot 140A and dog 142A, the edge 216 of the adz section 206 extends outwardly and may be utilized for adz/hewing applications. Further, in either position, the head attachment 200 may be utilized as a spike puller by gripping a spike (not shown) within the V-shaped notch 218 and prying upward along the convex surface 212 of the adz section 206 as well as the top edge 208 of the basher section 204.

Spade/Hoe Head

In FIG. 15, a spade and hoe head attachment 230 is illustrated, having a body flange 232 which is rigidly connected as by a fillet weld 234 to a shovel head 236 typically fabricated of hardened steel and formed in the manner well known in the art.

As with the metal cutter and basher/adz attachment 180 and 200, respectively, the spade/hoe head attachment 230 is formed having a pair of pivot slots 140 and 140A and a pair of dogs 142 and 142A formed along the body flange 232 which mount the attachment 230 to the axe head 18. As will be recognized, when positioned upon the axe head 18 with the pivot pin 140 and dog 142 cooperating with the pivot pin 22 and rotatable lock mechanism 26, the shovel head 236 extends vertically upward, beyond the axe head 18, in a direction parallel to the handle member 14 (as shown in FIG. 15). While in this position, the head attachment 230 functions as the spade or shovel with the lower edge 231 of the head attachment 230 providing a foot surface to urge the shovel head 236 into the ground (not shown).

Alternatively, with the space/hoe head attachment 230 being positioned upon the axe head 18 with the pivot slot 140A and dog 142A mating with the pin 22 and lock mechanism 26, respectively, the shovel head 236 extends substantially perpendicular to the handle member 14 (as indicated by the phantom lines in FIG. 15). As such, the shovel head 236 may be utilized as a conventional hoe by gripping the handle member 14 and dragging the shovel head 236 through the ground (not shown).

Brush Hook Head

A brush/hook head attachment 250 is depicted in FIG. 16 which may be utilized in a manner analogous to a sickle in clearing ground brush or other vegetation. As shown in FIG. 16, the brush/hook 250 is formed having an elongate blade member 252 which is integrally connected at one end to a body flange 254. The elongate blade 252 is preferably provided with a serrated edge 256 which tapers angularly outward from a strengthening rib 258 extending throughout the length of the blade member 252. The other edge 260 of the blade member 252 is additionally formed into a knife-like cutting edge by the two sidewalls 264 and 266 which converge from the supporting rib 258.

The body flange 254 of the brush/hook 250 is formed in the manner previously described, but in the preferred embodiment, is provided with only a single pivot slot 140 and dog 142 thereby facilitating the mounting of the brush/hook 250 in only one position upon the axe head 18. As will be recognized, when mounted upon the axe head 18, the blade section 252 of the brush/hook 250 extends substantially above the top surface of the axe head 18 in a generally parallel orientation to the handle member 14. As such, both edges 256 and 260 are exposed for contact with the ground brush (not shown).

In operation, a user may grip the handle 14 of the axe head 18 and swing the brush hook 250 against vegetation or the like, thereby cutting the vegetation either on the serrated edge 256 or knife-like edge 260. The applicant has found that in light grasses, such as rye, the knife-like edge 260 effectively severs the grass adjacent the ground. Additionally, when clearing heavier vegetation, such as sagebrush, the serrated edge 256 may be effectively utilized. Further, the serrated edge 256 may function as a saw to cut through heavy limbs of trees or the like.

Strap Wrench Head

In FIG. 17, a strap wrench head attachment 270 is illustrated, formed having a body flange 272 and a vice head 274 integrally connected by the arm member 276. The vice head 274 preferably includes a plurality of serrations 280 formed adjacent its extreme end, as well as a rectangular aperture 275 which is segregated into two compartments 277 and 279 by a kidney-shaped web 278.

As best shown in FIG. 17A, the compartment 277 is provided with a pin 282 which is rigidly mounted within the aperture 275 adjacent the lower end thereof. A strap 284, typically formed of leather or a heavy fabric weave, is wrapped about the pin 282 being maintained within the compartment 277 by the minimal spacing between the upper end of the web 278 and the sidewall 281 of the compartment 277.

As with the previously described head attachments, the strap wrench head attachment 270 includes a pair of pivot slots 140 and 140A and dogs 142 and 142A which facilitate the mounting of the head attachment 270 at two positions upon the axe head 18, in the manner previously described.

The operation of the strap wrench head attachment 270 of the present invention is illustrated in FIG. 17A. As shown, the strap 284, which extends upwardly from the compartment 277, may be wrapped about the periphery of the pipe 290 and inserted through the other compartment 278 formed in the strap head 274. Subsequently, the axe head handle member 14, and thus the head attachment 270, may be rotated in a counter-clockwise direction, as indicated by the arrow in FIG. 17A, wherein the serration 280 formed on the extreme end of the strap head 274, tightly press the strap 284 against the periphery of the pipe 290. Continued counter-clockwise rotation of the head member 270 causes the strap 284 to tighten about the circumference of the pipe 290 whereby the pipe 290 may be rotated about its axis.

Due to the dual pairs of pivot slots 140 and 140A and locking dogs 142 and 142A, the strap wrench head attachment 270 of the present invention may be effectively utilized in either of two positions upon the axe head, to easily accommodate the particular strap wrench application.

Pipe Wrench Head

The pipe wrench head attachment 300 of the present invention is illustrated in FIG. 18. As shown, the pipe-wrench head attachment 300 includes a body flange 302 having a pivot slot 140A and dog 142A for mounting upon the axe head 18, and a wrench member 304 rigidly attached to one end of the flange 302. The wrench member 304 is composed of a fixed jaw 306 and a movable jaw 308 which threadingly engages an adjustment knob 310 maintained laterally stationary by the fixed jaw 306. Rotation of the adjustment knob 310 causes the movable jaw 308 to travel either toward or away from the fixed jaw 306, thereby accommodating different sized pipes.

As shown, when mounted upon the axe head member 18 by the pivot slot 140A and dog 142A, the head attachment 300 extends above the top surface of the axe head 18 and is disposed substantially perpendicular to the axe head handle member 14. Thus, the wrench member 304 is positioned at an accessible location upon the axe head 18 to engage a pipe (not shown). As will be recognized, with the pipe (not shown) disposed between the movable and stationary jaws 308 and 306, respectively, the serrated edges 312 formed on the jaw members 308 and 306 bite into the pipe (not shown) whereby rotation of the axe head 18 and thus the pipe wrench head attachment 300 causes the pipe (not shown) to rotate about its axis.

Thus, it will be recognized, that by use of the above-described head attachments, the rescue axe device 10 of the present invention may be quickly and simply modified to function as either a metal cutter, basher/adz, spike puller, brush sickle, strap wrench, and pipe wrench, without the need of utilizing auxiliary fasteners to mount the attachment to the axe head member 18.

Self-Extricator Application

As previously mentioned, the emergency rescue axe device 10 of the present invention is specifically designed to provide a rescue worker with means for self-extricating himself from a burning structure. This particular self-extricating application of the emergency rescue axe device 10 is illustrated in FIG. 23, wherein a rescue worker 350 is shown hanging outboard from a window ledge 352 of a structure 354.

As described infra, the axe head 18 and pick head 16 are each provided with a shark's tooth point 64 and flange point 132, respectively (shown in FIGS. 4 and 5), which extend angularly toward the handle members 14 and 12. The applicant has found that this particular angular orientation of the points 64 and 132 and their spaced location from the main axis of the handle members 12 and 14, permit each of the handle members 12 and 14 to be effectively utilized as a ledge hanger.

Figure 23:
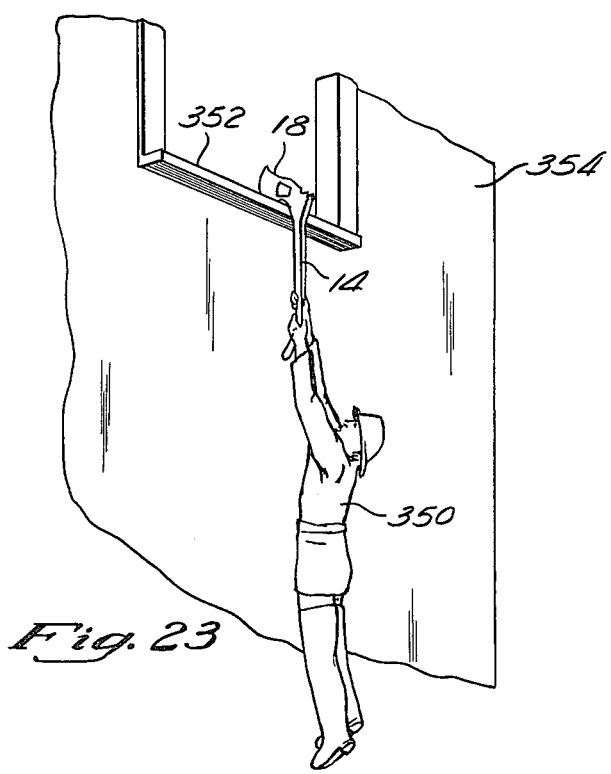
FIG. 23 is a perspective view of the axe head member of FIG. 2 being utilized as a ledge hanger, allowing a rescue worker to self-extricate himself from a burning building.

Thus, as illustrated in FIG. 23, a rescue worker 350, when confronted with being trapped in a burning building or the like, may extricate himself from the building by setting the shark's tooth point 64 of the axe head member 18 securely into the ledge 352 and subsequently lowering himself from the ledge 352 while gripping the handle member 14. During this lowering procedure, the added weight of user 350 upon the handle member 14 causes the shark's tooth point 64 to further embed itself within the ledge 352, thereby decreasing the possibility of slippage from the ledge 352 and securely supporting the rescue worker 350 temporarily outside of the structure 354 until additional help may arrive. Further, it will be noted that due to the rescue worker 350 being disposed at an elevation substantially below the window ledge 352, smoke and flames (not shown) exiting the structure 354 will rise above the rescue worker 350. As such, the self-extricating feature of the present invention permits the rescue worker to remain on the outside of the structure without being exposed to toxic fumes or intense heat.

Figure 24:
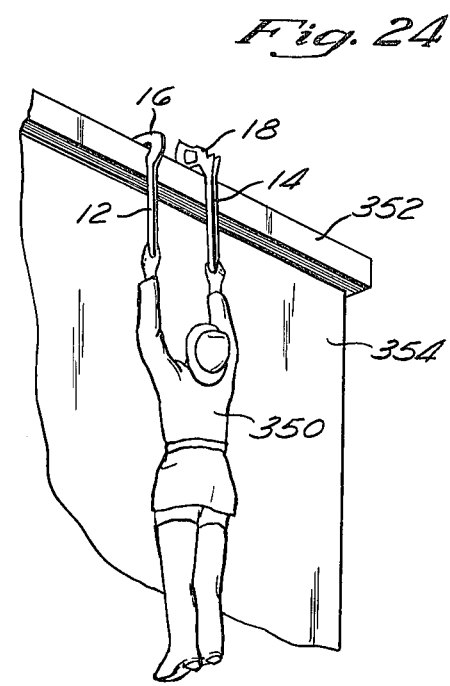
FIG. 24 is a perspective view of the axe head and pick head handle members being used separately but in conjunction with each other to form a ledge walker.

In FIG. 24, a further application of this same self-extricating feature of the device 10 of the present invention is depicted, wherein both handle members 12 and 14 may be utilized conjuctively to function as a ledge walker. As will be recognized, in this ledge walking application, both points 64 and 132 are embedded into the ledge 352 with the user 350 tightly gripping both handle members 12 and 14. Subsequently, the user 350 may transport himself along the ledge 352 by alternatively moving one of the handle members 12 or 14 laterally along the length of the edge 352 and embedding the point 64 or 132 therein while simultaneously supporting his weight with the other handle member 12 or 14. By repeating this alternating procedure, the user 350 can effectively relocate himself at a more desirable location within the structure.

Strap/Restraints

In order to provide increased safety during the ledge hanging and ledge walking applications described above, a pair of wrist straps 360, shown in FIG. 25A, may be selectively inserted within the apertures 131 and 37, formed in the ends of handle members 12 and 14, respectively (shown in FIGS. 4 and 3), to secure the rescue worker 350 to each of the handle members.

In the preferred embodiment, the straps 360 are formed of a tight-weaved nylon or rayon fabric which is capable of withstanding high tensile stress. At one end, the strap 360 is folded over upon itself and maintained thereon by suitable stitching 364 to form a loop 362. The loop 362 is advantageously sized to accommodate the wrist (as previously mentioned) or foot (not shown) of a user thereby being extremely suited for rescue applications.

At the other end, the strap 360 is preferably twisted, to double its thickness, and inserted within a fastener loop 366 being secured thereto by additional stitching 364. Such fastening loops 366 are well known in the art and include a spring-biased gate 368 which permits the fastener 366 to be selectively opened and closed by a user. As such, as user may quickly attach the strap 360 onto the handle members 12 and 14 in a manner previously described; or alternatively attach the fastener loop 366 to the open loop end 362 of an additional strap 360.

Figure 25:
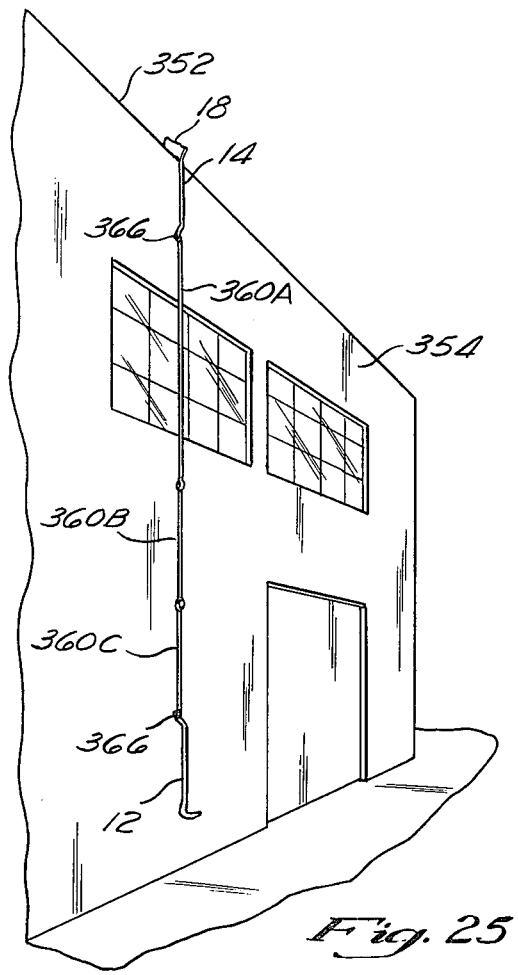
FIG. 25 is a perspective view of the axe head and pick head handle members being interconnected by a series of restraints to form an elongated climb down means.
Figure 25A:
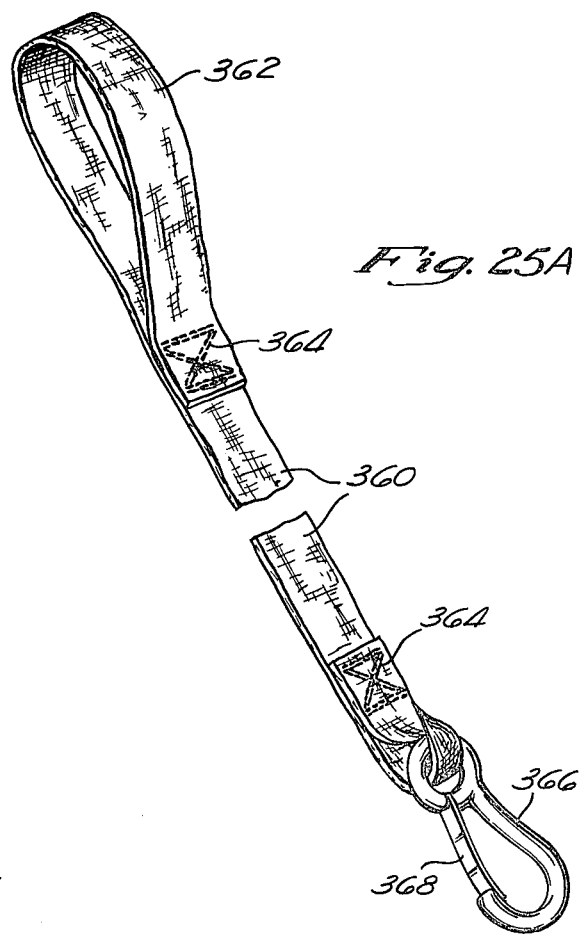
FIG. 25A is a perspective view of a restraint particularly suitable for use with the device of the present invention.

In the preferred embodiment, the emergency rescue axe device 10 of the present invention is provided with three straps or restraints 360 formed in the manner depicted in FIG. 25A, two of the straps preferably being three feet long and one being approximately six feet long. With the use of these three straps 360, the user may quickly adapt the emergency rescue axe device 10 of the present invention to accommodate various emergency situations.

A particular application for the use of these three straps 360 is shown in FIG. 25, wherein an elongate rope-like structure is formed by utilizing the handle members 12 and 14 in combination with the strap restraints 360. As shown in FIG. 25, the axe head handle members 14 may be positioned adjacent the top of the structure 354 and embedded within the ledge 352 in a manner described above. The six-foot restraint 360A may then be attached to the aperture 37 formed in the handle lock member 30 by the releasable fastening loop 366. Similarly, the additional three-foot restraints 360B and 360C may be attached in an end-for-end orientation with the fastener loops 366 being engaged with the looped end 362 of the prior restraint 360. Further, the lowest or last restraint 360C may, in turn, be connected to the pick head handle member 12 by inserting a fastener 366 through the aperture 131 formed on the heel 114.

By such a procedure, distances of seventeen feet may be scaled, thereby allowing a rescue unit user to climb down from an elevated structure 354 or, alternatively, lift equipment to the top of the structure. Further, it will be recognized that additional restraints 360 may be attached to the rope-like structure in the same end-to-end orientation to scale longer distances.

Holster, Shoulder Strap and Shoulder Harness

In combination with the emergency rescue axe device 10 and head attachments disclosed above, the present invention contemplates the use of a holster and strap arrangement which may be effectively utilized to carry both the head attachments and rescue axe device 10 upon a user. In FIGS. 26 and 27, two specific embodiments of a holster/strap arrangement are shown; with FIG. 26 illustrating a shoulder strap and FIG. 27 illustrating a shoulder harness.

Referring to FIG. 26, the shoulder strap 380 is preferably composed of an elongate strap member 382 formed from a tight-weaved nylon or rayon material, and includes an eyelet aperture 384 at each of its ends. Each of the eyelets 384 is provided with a keyhole fastener 386 which mates with a grommet button 388 fastened upon the holster 390 (shown in FIG. 30) to releasably mount the holster 390 in a manner well known in the art. As will be explained in more detail infra, the holster 390 is specifically formed to carry the above-described head attachments of the present invention.

One of the ends of the strap members 382 is additionally provided with a short strap segment 392 including a fastener loop 394 (as previously described in FIG. 25A), which is utilized to adapt the shoulder strap 380 into a boatswain's chair. An additional strap member 400 is attached at one end to the elongate strap member 382, at a point intermediate its length, and includes a carrying loop 402 at its extreme end. As shown, this loop 402 is sized to tightly receive the axe head member 18 of the emergency rescue device 10, thereby supporting the device 10 in an inverted vertical orientation.

At the intersection between the two belt members 382 and 400, a shoulder pad 396 is provided which mounts a retainer ring 398 on its outer surface. As shown, this retainer ring 398 receives the handle members 12 and 14 of the device 10, thereby supporting the device 10 at its upper end.

As will be recognized, the shoulder strap 380 is designed to be worn about the shoulder, with the holster 390 and strap loop 402 being disposed on opposite sides of the user. The applicant has found that by carrying the holster 390 and rescue axe device 10 in this opposed side orientation, restriction of movement of the user is held to a minimum.

Shoulder Harness

In FIG. 27, the shoulder harness 410 of the present invention is shown, which carries the emergency rescue axe device 10 and holster 390 in a manner similar to that described in FIG. 26, yet is specifically adapted to additionally carry a breather apparatus 412. (Such breather apparatus are well known in the art and extensively used by fire fighters when entering a burning structure.) As shown, the shoulder harness 410 is generally composed of two elongate strap members 414 and 416 which form a criss-crossing loop configuration. The members 414 and 416 are preferably joined at their intersection 417 by suitable stitching (not shown) and are provided with a semi-rigid mounting plate 418 which is adapted to carry the breathing apparatus 412.

The lower end of the strap 416 is provided with a carrier loop 420 which receives the axe head member 18 whereas the opposite end of the member 416 is provided with a keyhole fastener 386 which attaches to the grommet button 388 of the holster 390. Similarly, the strap member 414 is attached at its lower end to the holster 390 by way of a keyhole fastener 386, and is joined at its opposite end to the strap member 416 adjacent the top portion of the carrying loop 420.

As with the side strap of FIG. 26, the strap members 416 further includes a strap segment 392 adjacent the holster 390, which is provided with a releasable loop fastener 394 or the like; and a retainer ring 398, which receives the handle members 12 and 14. Additionally, a coupling strap 422 having a belt buckle or velcro fastener 424 extends substantially perpendicular between the strap members 414 and 416 to provide an adjustment means for the shoulder harness 410.

The shoulder harness 410 of the present invention is specifically designed to be carried about the shoulders of the user, with the breathing apparatus 412 disposed adjacent the user's shoulder blades, and the coupling strap 422 extending across the user's chest. Once positioned about the shoulders of the user, the harness 410 may be adjusted by way of the belt fastener 424 to tightly conform with the body of the user. It will be recognized that when worn by a user, the holster 390 and rescue axe device 10 are disposed upon opposite sides of the user which, as previously mentioned, advantageously limits the restriction upon the user's movements.

Boatswain's Chair

Referring to FIGS. 28 and 29, it may be seen that the shoulder strap 380 and shoulder harness 410 are specifically designed to be readily adapted into a boatswain's chair which may be used in conjunction with either of the handle members 12 or 14 to support a user upon the outside of the structure. The particular manner in which the side strap 380 of FIG. 26 is adapted into a boatswain's chair is depicted in FIG. 28. As shown, in the boatswain's chair configuration, the ends of the elongate strap member 382 are initially disconnected from the holster 390. Subsequently, the strap member 382 is wrapped about the user, with the shoulder pad 396 being disposed about the user's lower back, and the strap member 382 extending beneath the user's arm pits. The additional strap member 400 may then be wrapped between the legs of the user and extended upward to reside proximal the user's chest. Both ends of the elongate strap member 382 may then be inserted through the carrier loop 402 to form a slip-knot strap connection.

Subsequently, the keyhole fastener 386B, disposed on one end of the elongate strap member 382, may be connected to the lower end of the handle member 12, while the other keyhole fastener 386A is connected to the strap section 392 by way of the loop fastener 394. By such interconnections, the strap members 382 and 400 extend about the lower back, chest, and between the legs of the user and are securely attached to the handle member 12, thereby positively supporting the user's weight. Additionally, it will be recognized that due to the elongate strap members 382 being disposed in the slip-knot configuration with the carrier loop 402, the weight of the user will tend to cause the boatswain's chair to tighten about the user's body during use, thereby preventing any accidental loosening of the straps 382 and 400 about the user.

Similarly, in FIG. 29, it may be seen that the shoulder harness 410 of FIG. 27 may be adapted into a boatswain's chair. With the holster 390 removed from the straps 414 and 416, the shoulder harness 410 may be inverted from its orientation, shown in FIG. 27, whereby a user may step within the harness 410. As will be recognized, upon stepping within the harness 410, the intersection of the strap members 414 and 416, as well as the semi-rigid mounting plate 418, is positioned between the legs of the user, whereas the upper ends of the strap members 414 and 416 are wrapped about the sides of the user to reside in the vicinity of the user's chest. In this position, the coupling strap 422 prevents the straps 414 and 416 from separating from one another and additionally support the lower portion of the user's back.

The free ends of the both strap members 414 and 416 may then be inserted through the carrier loop 420 to form a slip-knot configuration, with the strap member 416 being attached to the end of the handle member 14 by the keyhole fastener 386A and the strap member 414 being connected to the strap segment 392 by way of the loop fastener 394 and button fastener 386B.

Thus, from the above, it will be recognized that when worn about a user in the manner illustrated in FIG. 29, the shoulder harness 410 securely maintains and adequately supports the user upon the end of the handle member 14. Additionally due to the specific strap arrangements and loop configurations disclosed, it will be understood that the adoption of the shoulder strap 380 and shoulder harness 410 into the boatswain's chair may be facilitated in a manner of seconds thereby preserving valuable time in recue applications.

Carrying Holster

In FIGS. 30, 31, and 32, the detailed construction of the holster 390 of the present invention, which is particularly adapted to carry certain of the above-referenced head attachments and strap restraints 360, is shown. The holster 390 is generally composed of an elongate body member 391, preferably fabricated of leather and formed having eliptical-shaped ends 393.

Each of the ends 393 include a leather cover plate 395 which is rigidly attached thereto along its peripheral edge by suitable stitching or adhesive. The covers 395 are raised from the surface of the body member 391, thereby defining two storage compartments 397 and 399. As shown, the height of the storage compartment 399 is formed substantially greater than the height of the storage compartment 397 and is provided with a divider 401 disposed in a parallel orientation between the top surface of the cover 395 and the body member 391. To maintain the relative spacing between the member 391, divider 401, and cover 395, a spacer rivet 404 is provided, being rigidly attached to the cover 395 and base member 391, and extending through the divider 401.

In the central region between the covers 395, the base member 391 includes two pairs of Velcro strap members 406A and 406B (shown in FIG. 30) which are disposed on opposite sides of a central rectangular aperture 408. As will become more apparent below, these Velcro straps 406A and 406B advantageously mount the restraining straps 360 to the holster 390 while the aperture 408 accommodates the body flange 232 of the shovel head attachment 236 (as shown in FIG. 31).

As previously mentioned, the holster 390 is additionally provided with a pair of grommet buttons 388 which are spaced from the lower surface of the base member 391, and are rigidly maintained thereon by a pair of rivets 409. As is well known in the art, these buttons 388 receive the keyhole-shaped fastening member 386 (as shown in FIGS. 26 and 27), which mount the holster 390 to the shoulder strap members. The cover members 395 further include a pair of Velcro strap members 411 and 413 adjacent opposite ends of the holster 390 which may, as described below, be utilized to maintain the holster 390 in the closed position.

Referring to FIG. 32, the particular manner in which the various head attachments are carried within the holster 390 may be described. As shown, the compartment 397 is formed to slidingly receive the shovel head attachment 236 with the V-shaped cutout 430 formed on the cover 395 allowing one end of the body flange 232 to enter into the compartment 397. As shown, when fully entered within the compartment 397, the opposite end of the body flange 232 is aligned with the elongate aperture 408, which permits the body flange 232 to extend through the aperture 408 when the holster 390 is folded over upon itself into a closed position, as indicated in FIG. 31. The compartment 399 is specifically adapted to carry the metal cutter head attachment 180 and basher/adz head attachment 200 therein. As shown, the metal cutter attachment 180 is preferably inserted between the divider 401 and body member 391 having its V-shaped cutting surface 188 disposed about the spacer rivet 404 and its body flange 184 extending slightly below the elongate aperture 407. Similarly, the basher/adz head attachment 200 is positioned on the opposite side of the divider 401 with a body flange 202 extending between the divider 401 and the lower surface of the cover member 395. Further, to maintain the relative orientation of the basher/adz head attachment 200 within the compartment 399, the U-shaped mounting slot 140, formed on the body flange 202, is surmounted about the spacer rivet 404.

As will be recognized, when disposed within the compartments 397 and 399 in the manner described, the shovel 236, metal cutter 180, and basher/adz 200 head attachments are securely maintained in their relative orientation and are restrained from excessive vibration.

As shown in FIG. 32, the base member 391 is additionally provided with a pair of preferential fold lines 440 which are typically formed by scoring the leather base member 391. These preferential fold lines 440 permit the base member 391 to be folded over upon itself into a configuration shown in FIG. 31. When folded over in such a manner, the Velcro straps 411 and 413, disposed upon the inner surfaces of the cover members 395, are aligned with one another and may be manually pressed together to maintain the closed configuration of the holster 390.

As shown in FIG. 31, the plural strap restraints 360 may be folded onto themselves to form an accordianlike structure and may be maintained within the holster 390 by the pair of Velcro straps 406. When carried in this particular manner, the loop fastener 366, disposed at one end of the strap restraints 360 (shown in FIG. 25A), may be conveniently positioned along the top surface of the holster 390 and maintained thereon by a pair of elastic straps 442 rigidly mounted to the outer surface of the base member 391. Further, to prevent any accidental contact with the body flange 232 of the shovel head member 236, a cover strap 444 is rigidly attached to the outer surface of the base member 391.

It will be noted that three head attachments are carried by the holster 390, additional head attachments may be accommodated by forming the compartment 399 of the holster 390 to possess larger interior dimensions as well as dividers 401, or by using an additional holster. Further, it will be noted that due to the relative compact size of the holster 390, as well as its dual storage compartments 397 and 399, the holster 390 of the present invention provides a compact means for carrying the necessary head attachments and strap restraints to completely meet the diversity of the rescue applications.

In summary, it will be noted that the emergency rescue axe device 10 of the present invention provides an effective and convenient multi-purpose combination tool which effectively eliminates the diversity, storage, and safety deficiencies associated in the prior art. In particular, the pivotal mounting of the handle members permit the separate, independent, or conjunctive use of the handle members to perform a variety of specific functions. Further, by use of the plural head attachments and rotatable locking member, the present invention may be quickly adapted to perform specialized tool operations. In addition, the novel holster and shoulder strap arrangement provides a convenient means for carrying the rescue axe 10 and head attachment upon the user while further being readily adaptable to function as a boatswain's chair. Thus, the present invention discloses a complete emergency rescue system which is extremely portable in nature and capable of providing maximum assistance in any emergency situation.

I claim:

1. In a combination tool kit, including an axe head mounted upon an elongated axe handle and a pick head mounted upon an elonged pick handle, wherein said pick head is mountable to said axe head by means permitting said axe head and axe handle and said pick head and pick handle to be used (a) independently of each other, (b) as a composite structure (c) sissored relative to one another and (d) oriented in an end-for-end, substantially linear, configuration, said combination tool kit comprising:

(a) a recess in said axe head having a fixed pivot pin for releasably pivotally mounting said pick head;

(b) a lock means rotatably mounted upon said axe head for movement wherein a portion of said lock means selectively extends within said recess so that said lock means locks said axe head and axe handle and said pick head and pick handle together when said pick head is pivotally mounted on said axe head; and (c) lock apperture means formed on said pick head, having a shape complimentary to said portion of said lock means, said portion of said lock means engaging said lock apperture means when said portion extends within said recess when said pick head is pivotally mounted on said axe head so that said pick head and pick handle are securely locked to said axe head and axe handle without the use of auxiliary tools or mounting bolts or screw fastners.

2. The combination tool kit of claim 1 further comprising a plurality of head attachments independently mountable upon said axe head for providing additional tool functions such as bashing, adz-hewing, metal cutting, and hoeing, and wherein each of said plurality of head attachments includes a lock apperture means formed on said head attachments having a shape complimentary to said portion of said lock means, said portion of said lock means engaging said lock apperture means when said portion extends within said recess when any of said plurality of head attachments is respectively pivotally mounted on said axe head so that said head attachments are respectfully securely locked to said axe head without the use of auxiliary tools or mounting bolts or screw fastners.

3. The combination tool kit of claim 2 wherein said recess of said axe head includes a formed rear wall and wherein each of said pick head and plurality of head attachments respectively includes a heel complimentary to said rear wall, said heel abutting said rear wall when any of the said pick head or plurality of head attachments is respectively mounted on said axe head, wherein impact received by said pick head or head attachments respectively is imparted to said rear wall.

4. The combination tool kit of claim 2 wherein said lock means additionally lines and orients each of said pick and said head attachments when respectively mounted upon said axe head.

5. The combination tool kit of claim 2 wherein said lock means comprises a substantially rectangular-shaped member pivotally mounted about a pivot axis laterally spaced from said recess and perpendicular to said fixed pivot pin.

6. The combination tool kit of claim 5 wherein said pivot axis is oriented substantially parallel to said elongate handle mounted to said axe head.

7. The combination tool kit of claim 5 wherein said portion of said lock member comprises one end of said lock member.

8. The combination tool kit of claim 7 wherein said end of said lock member includes a pair of beveled sidewalls.

9. The combination tool kit of claim 8 wherein said lack aperture means comprises a mounting aperture formed on an edge of each of said pick head and said plural head attachments.

10. The combination tool kit of claim 5 wherein said axe head additionally includes a pin member biased against said lock member, said pin member selectively engaging a pair of apertures formed in said lock member to provide a detent mechanism for said lock member.

11. The combination tool kit of claim 10 wherein said lock detent mechanism maintains said lock member in engagement with said aperture means.

12. In a combination tool kit including a first tool head and a second tool head, each mounted respectively to an elongated handle, said second tool head independently mountable to said first tool head by means permitting said handles to be used (a) independently of each other (b) as a composite handle structure (c) sissored relative to one another and (d) oriented in an end, substantially linear, configuration, plural head attachments separately and independently mountable upon said first tool head for providing additional tool functions such as bashing, adz-hewing, metal cutting and hoeing, said combination tool comprising:
 (a) a recess in said first tool head including means for releasably, pivotally mounting any of said second tool head or plural head attachments; and
 (b) common lock means mounted upon said first tool head for separately locking any of said second tool head or plural head attachments upon said first tool head without the use of auxiliary tools or bolts or screw fastners.

13. The combination tool kit as recited in claim 12 further comprising a means for carrying said first tool head and handle mounted to such second tool head and handle and a holster for carrying said plurality of head attachments.

14. The combination tool kit of claim 12 wherein said common locking means additionally maintains the orientation of the second tool head and said plural head attachments when respectively mounted to said first tool head.

15. The combination tool kit of claim 12 wherein said head attachments include a flange adapted to be received within said recess.

16. The combination tool kit of claim 15 wherein said locking means comprises a lock member fixed on said first tool head and rotatably mounted for movement wherein a portion of said lock member selectively extends within said recess, and said flange includes aperture means having a shape complimentary to said portion of said lock member, said portion of said lock member engaging said aperture means when said portion extends within said recess to securely lock said head attachments when respectively mounted to said first tool head.

17. The combination tool kit of claim 16 wherein said lock member is rotatably mounted within an aperture formed on said first tool head and communicating with said recess.

18. The combination tool kit of claim 13, wherein said carrying means includes a shoulder strap for carrying said combination tool upon a user comprising:
 a first strap member adapted to be worn intermediate its length about the shoulder of a user and including means for releasably supporting a holster adjacent both ends; and
 a second strap member connected to said first strap member at one end and including loop means at its other end for receiving one end of said combination tool, said strap members, when worn, being disposed on opposite sides of a user to support holster and said combination tool on said user at a location least restrictive to the user's movement.

19. The combination tool kit of claim 18 wherein first strap member includes a mounting ring adjacent the interconnection between said first and second strap members, said strap means supporting the other end of said combination tool.

20. The combination tool kit of claim 19 wherein said combination tool is carried in a substantially vertical orientation upon said user.

21. The combination tool kit of claim 20 wherein said first and second strap members may be arranged to form a boatswain's chair.

22. The combination tool kit of claim 13, wherein such carrying means includes a shoulder harness for carrying said combination tool upon a user comprising:
a first and second strap member interconnected to form a criss-crossing loop configuration, a portion of said loop adapted to be worn about the shoulders of a user; and
means formed on opposite ends of each strap member for receiving one end of said combination tool and supporting a holster, respectively, said means formed on said strap members extending on opposite sides of said user when worn, to support said holster and said combination tool at a location least restrictive to said user.

23. The combination tool kit of claim 22 wherein said first and second strap members are interconnected by a detachable strap segment, said strap segment including means for adjusting said strap members upon said user.

24. The combination tool kit of claim 23 wherein said second strap member includes a retainer ring which receives the other end of said combination tool.

25. The combination tool kit of claim 24 wherein said combination tool is disposed in a substantially vertical orientation upon said user.

26. The combination tool kit of claim 25 wherein said strap members may be adapted to form a boatswain's chair.

27. The combination tool kit of claim 13, wherein said holster includes:
an elongate flexible base member;
a pair of cover members attached to said flexible base member adjacent opposite ends and raised from the surface of said base member to define a pair of compartments, each compartment sized to slidingly receive at least one of said head attachments therein; and
a pair of preferential fold lines formed on said base member intermediate said cover members, said fold lines permitting said base member to be folded over upon itself whereby said compartments reside on the interior of said base member.

28. The combination tool kit of claim 27 wherein at least one of said compartments include divider means to segregate said compartments into plural tool receiving pockets.

29. The combination tool kit of claim 27 wherein said base member includes an aperture which receives a portion of one of said tool attachments to allow said base member to be folded over upon itself.

30. The combination tool kit of claim 27 wherein said base member includes fastening means for maintaining said base member in said folded over configuration.

31. The combination tool kit of claim 27 wherein said base member includes means for releasably mounting a plurality of belts arranged in a stacked configuration.

32. The combination tool kit of claim 27 wherein said base member includes means for releasably mounting a carrying strap positioned on one side of said base member.

33. The combination tool kit of claim 27 wherein one of said compartments is sized to receive a spade tool head attachment.

34. The combination tool kit of claim 28 wherein said one of said compartments is sized to receive a metal cutter head attachment and a basher-adz head attachment on opposite sides of said divider.

35. In a combination tool comprising an elongate handle member, a tool head mounted adjacent one end of said handle member, and a plurality of tool members, each adapted to be removably attached upon said tool head, a locking means for releasably mounting said tool members to said tool head comprising:
a recess formed in said tool head adapted to receive a flange formed on each of said tool members said flange additionally includes a pivot slot formed on an edge of said flange, said pivot slot engaging a mounted pin formed in said recess in said tool head;
a lock member fixed on said tool head and rotatably mounted for movement wherein a portion of said lock member selectively extends within said recess; and
aperture means formed on said flange having a shape complimentary to said portion of said lock member, said portion of said lock member engaging said aperture means when the portion extends within said recess to securely lock said tool member to said tool head.

36. The combination tool of claim 35 wherein said locking means additionally orients said head attachments upon said tool head.

37. The combination tool of claim 35 wherein said lock member is rotatably mounted within an aperture formed on said tool head and communicating with said recess.

38. The combination of claim 37 wherein said lock member is mounted about an axis disposed perpendicular across said aperture.

39. The combination tool of claim 38 wherein said portion of said lock member comprises one end of said lock member.

40. The combination tool of claim 39 wherein said one end of said lock member includes a pair of beveled sidewalls.

41. The combination tool of claim 40 wherein said aperture means comprises a mounting aperture formed on at least one edge of said flange, said aperture including tapered sidewalls which tightly receive said beveled sidewalls of said lock member.

42. The combination tool of claim 41 wherein said flange includes plural mounting apertures and pivot slots along opposite edges, said plural apertures and slots oriented relative one another to form discrete mounting pairs which permit said tool members to be positioned upon said tool head in varying orientations.

43. A combination tool comprising:
a pair of elongate handle members;
a first tool head attached adjacent one end of one of said handle members;
a second tool head attached adjacent one end of the other one of said handle members, said second tool heads pivotally moutable to a fixed pivot pin within a recess on said first head to permit said handle members to be scissored apart; and
locking means rotatably mounted on said first tool head for releasably locking said first and second tool heads together such locking means rotatable about an axis perpendicular to said pivot pin.

44. The combination tool of claim 43 wherein said handle members are each substantially an I-beam member.

45. The combination tool of claim 44 wherein each of said I-beam members include a plastic insert on opposite sides of the web of said I-beam.

46. The combination tool of claim 43 wherein said handle members are electrically isolated from said tool heads.

47. The combination tool of claim 43 wherein said one of said handle membes include second locking means formed on the other end of said handle member, said second locking means releasably locking said handle members together.

48. The combination tool of claim 47 wherein said second locking means comprises a latch member including an extending tab, reciprocable axially upon said handle member to engage both of said handle members.

49. The combination tool of claim 47 wherein said second locking means comprises a spring clip, rotatable upon said one of said handle members to selectively engage said one of said handle members to selectively engage said other one of said handle members.

50. The combination tool of claim 43 wherein said first tool head comprises an axe head.

51. The combination tool of claim 43 wherein said second tool head comprises a pick head.

52. The combination tool of claim 50 or claim 51 wherein said heads include a projecting point adjacent one edge which allow said handle members to be utilized as a self-extricating ledge hanger.

53. A combination tool comprising:
a pair of pivotally connected elongate handle members;
a first tool head attached to one of said handle members;
a second head attached to the other one of said handle members; and
means formed on said first tool head for releasably locking said first and second tool heads together, said means permitting said handle members to extend in an end-for-end, substantially linear, orientation to form a rigid pry bar structure said means having a lock member engaging a mounting slot formed in said second tool head.

54. The combination tool of claim 53 wherein said lock member positioned within an aperture formed on said first tool head to selectively engage said second tool head.

55. The combination tool of claim 54 wherein said lock member is rotatably mounted to said first tool head within said aperture.

56. The combination tool of claim 55 wherein said second tool head resides within a recess formed in said first tool head.

57. The combination tool of claim 55 wherein said second tool head is formed to tightly abut with a portion of said recess, said abutment distributing the forces generated on said combination tool between said lock member and said tool heads.

58. The combination tool of claim 53 wherein said other one of said handle members include a pry bar head at one end.

59. The combination tool of claim 58 wherein said pry bar head includes a self-contained prying fulcrum.

60. A combination tool kit comprising:
(a) a handle member including a tool head adjacent one end;
(b) a plurality of interchangeable tool members formed having a mounting flange;
(c) a recess formed in said tool head having a fixed pivot pin transversely formed in said recess adapted for detachable pivotally mounting said mounting flange of any of said interchangeable tool members respectively; and
(d) locking means disposed on said tool head, rotatably mounted for movement to selectively engage said flange within said recess, said engagement securely mounting one of said interchangeable tool members to said tool head.

61. The combination tool of claim 60 wherein another one of said interchangeable tools comprises a pick head having a handle member attached thereto.

62. The combination tool kit of claim 60 wherein one of said interchangeable tool members comprises a metal cutter.

63. The combination tool kit of claim 62 wherein said metal cutter includes a cutting blade and a prying blade, said cutting blade including an increased thickness top edge which spreads the metal in the vicinity of the cutting blade to facilitate removal of re-insertion of the metal cutter into the metal.

64. The combination tool kit of claim 60 wherein another one of said interchangeable tools comprises a heavy basher.

65. The combination tool kit of claim 64 wherein said basher includes a adz-hewing member.

66. A combination tool kit of claim 65 wherein said adz-hewing member includes a V-shaped aperture adapted to form a spike puller.

67. The combination tool kit of claim 60 wherein another one of said tool members comprises a spade, said mounting flange of said spade having means for multiple mounting orientations.

68. The combination tool kit of claim 60 wherein another one of said tool members comprises a brush hook.

69. The combination tool kit of claim 68 wherein said brush hook includes a pair of cutting edges, one of said edges comprising a knife edge, the other of said edges comprising a serrated sawing edge.

70. The combination tool kit of claim 60 wherein another one of said tool members comprises a strap wrench.

71. The combination tool kit of claim 60 wherein another one of said tool members comprises a pipe wrench.

72. The combination tool kit of claim 60 wherein said flange is formed to engage said locking means at plural locations within said recess, said plural locations positioning said tool members at different orientations upon said one of said tool heads.

73. A combination tool comprising:
a first handle member including an axe head mounted adjacent one end;
a second handle member including a pick head mounted adjacent one end;
pivot means for detachably mounting said axe and pick head together; and
means for selectively locking said axe and pick heads about said pivot means, said means permitting said handle members to be selectively (a) locked together as a composite structure, (b) scizzored apart relative one another, and (c) rigidly interconnected in an end-for-end, substantially linear, orientation.

74. The combination tool of claim 73 wherein said locking means comprises a rotatable locking member disposed on said axe head.

75. The combination tool of claim 74 wherein said pick head resides within a recess formed in said axe head.

76. The combination tool of claim 75 wherein said axe head and pick include means formed thereon for cutting a cable when said handle members are scizzored apart relative one another.

77. The combination tool of claim 76 wherein said end-for-end, substantially linear, orientation provides an extended pry bar structure for said combination tool.

78. In a combination tool having an elongate handle member including a tool head mounted on one end, said tool head formed with a recess adjacent one end and including a pin disposed within said recess, interchangeable tool attachments adapted to be mounted upon said tool head comprising:

a tool body formed to function as an individual tool implement;

a mounting flange integrally connected to said tool body and adapted to be received within said recess;

slot means formed adjacent one edge of said flange; and aperture means formed adjacent an opposite edge of said flange, said slot means engaging said pin disposed within said recess and said aperture means selectively receiving a portion of a lock member pivotally mounted on said tool head to rigidly mount said tool attachment to said tool head.

79. The combination tool of claim 78 wherein said aperture means is formed in a complimentary shape to said portion of said lock member.

80. The combination tool of claim 79 wherein said flange includes a plurality of said slot means and said aperture means to position said tool attachments at different locations upon said tool head.

* * * * *